(12) United States Patent
Bond et al.

(10) Patent No.: US 11,598,946 B2
(45) Date of Patent: Mar. 7, 2023

(54) WIDEFIELD THREE-DIMENSIONAL MICROSCOPY WITH A QUANTUM ENTANGLEMENT LIGHT SOURCE

(71) Applicant: Lawrence Livermore National Security, LLC, Livermore, CA (US)

(72) Inventors: Tiziana C. Bond, Livermore, CA (US); Matthew A. Horsley, Danville, CA (US); Shervin Kiannejad, Brentwood, CA (US); Ted Laurence, Livermore, CA (US); Ty Samo, Walnut Creek, CA (US); Peter Weber, Berkeley, CA (US); Xiyu Yi, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 218 days.

(21) Appl. No.: 17/070,654

(22) Filed: Oct. 14, 2020

(65) Prior Publication Data
US 2022/0113529 A1 Apr. 14, 2022

(51) Int. Cl.
*G02B 21/36* (2006.01)
*G02F 1/35* (2006.01)
(Continued)

(52) U.S. Cl.
CPC ........... *G02B 21/361* (2013.01); *G02B 21/06* (2013.01); *G02F 1/3501* (2013.01); *H04N 13/254* (2018.05)

(58) Field of Classification Search
CPC ...... G02B 21/361; G02B 21/06; G02B 21/16; G02B 21/365; G02F 1/3501; H04N 13/254; H04N 5/232
(Continued)

(56) References Cited

U.S. PATENT DOCUMENTS 9,310,595 B2 * 4/2016 Iketaki .............. G02B 21/0076
2004/0100637 A1 5/2004 Teich et al.
(Continued)

FOREIGN PATENT DOCUMENTS

WO 2020194025 A1 10/2020

OTHER PUBLICATIONS

Agrawal, Anurag, et al. "Limits of 3D dipole localization and orientation estimation for singlemolecule imaging: towards Green's tensor engineering." Optics express 20.24 (2012): 26667-26680.
(Continued)

*Primary Examiner* — Stephone B Allen
*Assistant Examiner* — Rahman Abdur
(74) *Attorney, Agent, or Firm* — Perkins Coie LLP

(57) ABSTRACT

Devices, systems and methods for widefield three-dimensional (3D) microscopy with a quantum entanglement light source are described. An example method includes generating a first set of photons and a second set of photons, wherein each of the photons in the first set is quantum entangled with a corresponding photon in the second set, directing the second set of photons toward a sample and simultaneously directing the first set of photons toward a first two-dimensional (2D) detector, detecting, from the sample, a plurality of photons at a second 2D detector, analyzing detections from the first and second 2D detectors to determine coincidence information, and determining one or more characteristics associated with at least a three-dimensional (3D) section of the sample based on collective detections at the first and the second 2D detectors.

20 Claims, 12 Drawing Sheets

(51) Int. Cl.
H04N 13/254 (2018.01)
G02B 21/06 (2006.01)

(58) Field of Classification Search
USPC .......................................................... 359/385
See application file for complete search history.

(56) References Cited

U.S. PATENT DOCUMENTS

| | | | | |
|---|---|---|---|---|
| 2006/0152719 | A1* | 7/2006 | Iuliano | G01J 3/44 |
| | | | | 356/301 |
| 2010/0258708 | A1 | 10/2010 | Meyers et al. | |
| 2014/0340570 | A1* | 11/2014 | Meyers | G06T 5/007 |
| | | | | 348/370 |
| 2016/0005154 | A1* | 1/2016 | Meyers | G06T 7/11 |
| | | | | 382/274 |
| 2017/0018061 | A1* | 1/2017 | Meyers | G06T 5/008 |
| 2020/0288107 | A1 | 9/2020 | Hendrickson | |

OTHER PUBLICATIONS

Atul-Nayyar, A. et al. "The arbuscular mycorrhizal symbiosis links N mineralization to plant demand." Mycorrhiza 19(4):p. 239-246, 2009.

Balaconis, M.K. et al. "Biodegradable Optode-Based Nanosensors for in Vivo Monitoring." Analytical Chemistry, 2012. 84(13): p. 5787-5793.

Balaconis, M.K. et al. "The design and development of fluorescent nano-optodes for in vivo glucose monitoring." J. Diabetes Sci. Technol., 2011. 5(1): p. 68-75.

Barea, J.M. et al. "Mycorrhizosphere interactions to improve plant fitness and soil quality." Antonie Van Leeuwenhoek International Journal of General and Molecular Microbiology 81(1-4): p. 343-351, 2002.

Baveye, P.C. et al. "Emergent Properties of Microbial Activity in Heterogeneous Soil Microenvironments: Different Research Approaches Are Slowly Converging, Yet Major Challenges Remain." Frontiers in Microbiology, 2018. 9: p. 1929.

Cash, K.J. et al. "In Vivo Histamine Optical Nanosensors." Sensors (Basel), 2012. 12(9):p. 11922-11932.

Cash, K.J. et al. "Phosphorescent Nanosensors for In Vivo Tracking of Histamine Levels." Anal. Chem., 2013. 85(13): p. 6312-6318.

Cheng, L., et al. "Arbuscular mycorrhizal fungi increase organic carbon decomposition under elevated CO2." Science, 2012. 337(6098): p. 1084-1087.

Clark, R.B. et al. "Response of Mycorrhizal Switchgrass to Phosphorus Fractions in Acidic Soil." Communications in Soil Science and Plant Analysis 36(9-10):p. 1337-1359, 2005.

Downie, H. et al. "Transparent soil for imaging the rhizosphere." PLoS ONE, 2012. 7(9): p. e44276.

Dreyer, B. et al. "Use of the Autofluorescence Properties of AM Fungi for AM Assessment and Handling." 2009, Springer, Berlin, Heidelberg: Berlin, Heidelberg, p. 123-140.

Dubach, J.M. et al. "Fluorescent Nanoparticles for the Measurement of Ion Concentration in Biological Systems." J. Visualized Exp., 2011(53): p. 1-5.

Dubach, J.M. et al. "Visualizing sodium dynamics in isolated cardiomyocytes using fluorescent nanosensors." Proc. Natl. Acad. Sci., 2009. 106(38): p. 16145-16150.

Ferris, M.S. et al. "A dual-indicator strategy for controlling the response of ionophore-based optical nanosensors." Sensors and Actuators B: Chemical, 2018. 256: p. 674-681.

Flemming, H.C. et al. "Biofilms: an emergent form of bacterial life." Nat Rev Microbiol, 2016. 14(9):p. 563-75.

Grover, Ginni, et al. "Super-resolution photon-efficient imaging by nanometric double-helix point spread function localization of emitters (SPINDLE)." Optics express 20.24 (2012): 26681-26695.

Hall-Stoodley, L. et al. "Bacterial biofilms: From the natural environment to infectious diseases." Nature Reviews Microbiology, 2004. 2(2): p. 95-108.

Herman, D.J., et al. "Interactions between an arbuscular mycorrhizal fungus and a soil microbial community mediating litter decomposition." FEMS Microbiology Ecology, 2012. 80(1): p. 236-247.

Hodge, A. "Arbuscular mycorrhizal fungi influence decomposition of, but not plant nutrient capture from, glycine patches in soil." New Phytologist, 2001. 151(3): p. 725-734.

Hodge, A. et al. "An arbuscular mycorrhizal fungus accelerates decomposition and acquires nitrogen directly from organic material." Nature 413(6853):p. 297-299, 2001.

Jewell, M.P. et al. "Luminescent Nanosensors for Ratiometric Monitoring of Three-Dimensional Oxygen Gradients in Laboratory and Clinical Pseudomonas aeruginosa Biofilms." Applied and Environmental Microbiology, 2019. 85(20): p. e01116-19.

Jung, Gregor, et al. "Fluorescence lifetime of fluorescent proteins." Fluorescent Proteins I. Springer, Berlin, Heidelberg, 2011. 69-97.

Ker, K. et al. "Evidence for enhanced N availability during switchgrass establishment and seeding year production following inoculation with rhizosphere endophytes." Archives of Agronomy and Soil Science 60(11):p. 1553-1563, 2014.

King, Sharon V., et al. "Spatial light modulator phase mask implementation of wavefront encoded 3D computational-optical microscopy." Applied optics 54.29 (2015): 8587-8595.

Lakowicz, Joseph R. et al. "Fluorescence lifetime-based sensing of pH, Ca2+, K+ and glucose." Sensors and Actuators B: Chemical 11.1-3 (1993): 133-143.

Ma, L. et al. "Hydrogel-based transparent soils for root phenotyping in vivo." Proceedings of the National Academy of Sciences, 2019. 116(22): p. 11063-11068.

McLaughlin, S.B. et al. "Development of switchgrass (Panicum virgatum) as a bioenergy feedstock in the United States." Biomass and Bioenergy 28(6): p. 515-535, 2006.

Morris, E.K. et al. "Visualizing the dynamics of soil aggregation as affected by arbuscular mycorrhizal fungi." The ISME Journal, 2019. 13(7): p. 1639-1646.

Nayuki, K. et al. "Cellular Imaging of Cadmium in Resin Sections of Arbuscular Mycorrhizas Using Synchrotron Micro X-ray Fluorescence." Microbes and Environments, 2014. 29(1): p. 60-66.

Nicolson, T.H. "Mycorrhiza in the Gramineae: I. Vesicular-arbuscular endophytes, with special reference to the external phase." Transactions of the British Mycological Society, 1959. 42(4): p. 421-438.

Nuccio, E.E. et al. "An arbuscular mycorrhizal fungus significantly modifies the soil bacterial community and nitrogen cycling during litter decomposition." Environmental Microbiology 15(6):p. 1870-1881, 2013.

O'Callaghan, F.E. et al. "New live screening of plant-nematode interactions in the rhizosphere." Scientific Reports, 2018. 8(1): p. 1-17.

Padgett, Miles J. et al. "An introduction to ghost imaging: quantum and classical." Philosophical Transactions of the Royal Society A: Mathematical, Physical and Engineering Sciences 375.2099 (2017): 20160233.

Pavani, Sri Rama Prasanna, et al. "Three-dimensional, single-molecule fluorescence imaging beyond the diffraction limit by using a double-helix point spread function." Proceedings of the National Academy of Sciences 106.9 (2009): 2995-2999.

Pini, F. et al. "Bacterial Biosensors for in Vivo Spatiotemporal Mapping of Root Secretion." Plant Physiology, 2017. 174(3): p. 1289-1306.

Qin, Y. et al. "Quantitive binding constants of H+-selective chromoionophores and anion ionophores in solvent polymeric sensing membranes." Talanta, 2002. 58(5): p. 909-918.

Ruckh, T.T., et al. "Polymer-Free Optode Nanosensors for Dynamic, Reversible, and Ratiometric Sodium Imaging in the Physiological Range." Scientific Reports, 2013. 3: p. 1-6.

Shank, E.A. "Considering the Lives of Microbes in Microbial Communities." mSystems, 2018. 3(2):p. 152.

Sharma, K. "Illuminating dark matter: Light microscopy and raman microspectroscopy through transparent porous media for applications in soil and sediment microbial ecology" in Department of Biology. 2019, University of North Carolina.

(56) References Cited

OTHER PUBLICATIONS

St. John, T.V. et al. "Association of vesicular-arbuscular mycorrhizal hyphae with soil organic particles." Ecology, 1983. 64(4): p. 957-959.
Stewart, P.S. at al. "Physiological heterogeneity in biofilms." Nature Reviews Microbiology, 2008. 6(3): p. 199-210.
Takehara, H. et al. "On-chip cell analysis platform: Implementation of contact fluorescence microscopy in microfluidic chips," AIP Advances 7, 095213 (2017).
Varnavski, Oleg et al. "Entangled photon excited fluorescence in organic materials: an ultrafast coincidence detector." The journal of physical chemistry letters 8.2 (2017): 388-393.
Yan, R. et al. "Spectrally resolved and functional super-resolution microscopy via ultrahigh-throughput single-molecule spectroscopy." Accounts of chemical research, 51(3), 697-705, 2018.
Zhang, L. et al. "Arbuscular mycorrhizal fungi stimulate organic phosphate mobilization associated with changing bacterial community structure under field conditions." Environmental Microbiology, 2018. 20(7): p. 2639-2651.
International Search Report and Written Opinion dated Jan. 27, 2022 for International Patent Application No. PCT/US2021/054402.

* cited by examiner

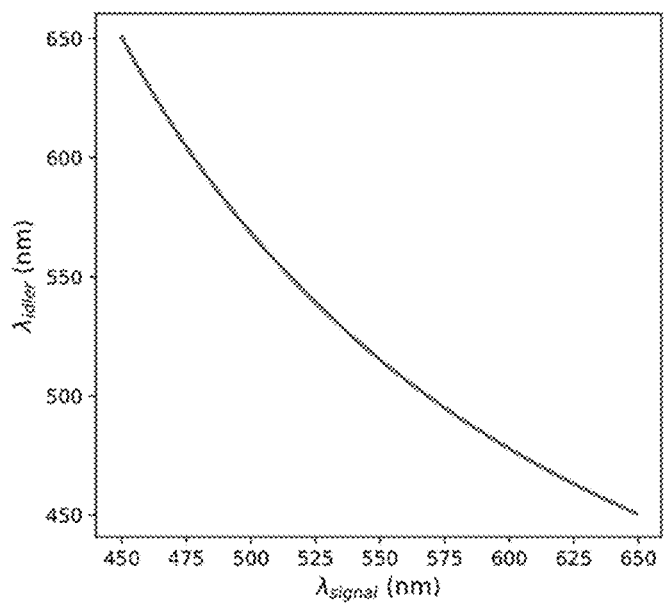
FIG. 8
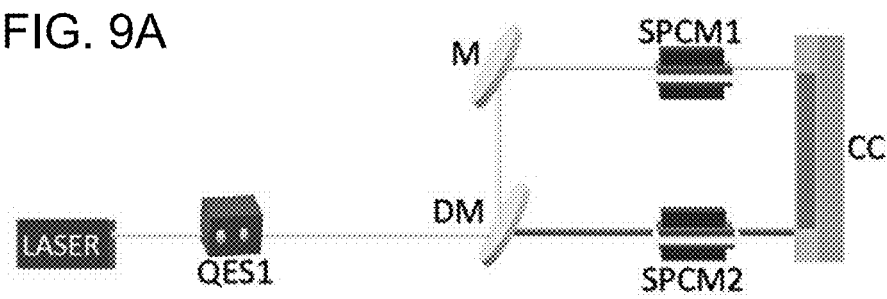
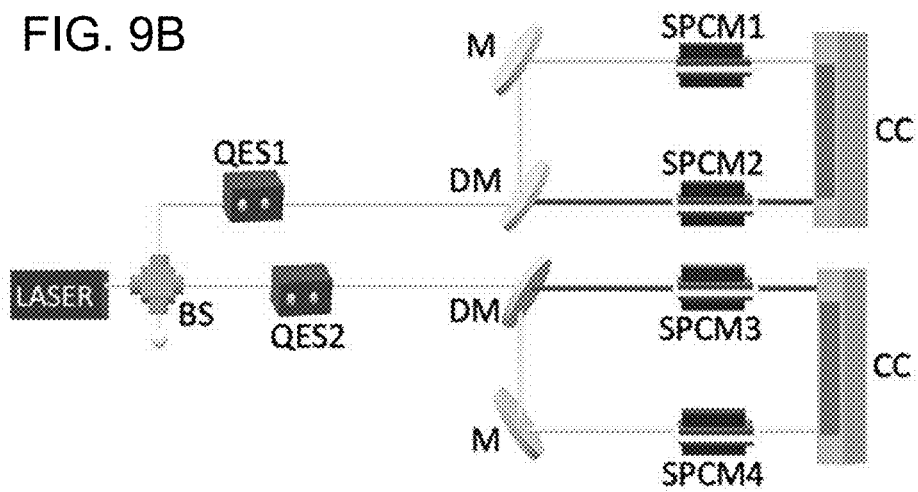

US 11,598,946 B2

WIDEFIELD THREE-DIMENSIONAL MICROSCOPY WITH A QUANTUM ENTANGLEMENT LIGHT SOURCE

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

This document generally relates to quantum imaging systems, and more particularly, to three-dimensional microscopy with a quantum entanglement light source.

BACKGROUND

Optical microscopy and spectroscopy are major tools in modern research covering various disciplines, ranging from fundamental physics, to material science, chemistry, and life sciences. These tools are significantly improved by leveraging quantum states, such as superposition and entanglement, and also enable various novel imaging modalities possible.

SUMMARY

Embodiments of the disclosed technology relate to methods, devices and systems for widefield three-dimensional (3D) fluorescence microscopy with a quantum entanglement light source. The disclosed embodiments can be used in many fields such as biology, dynamic 3D imaging, bioimaging (including bioenergy applications), and phototoxicity. For instance, the embodiments described in the present document advantageously enable functional fluorescence microscopy with snapshot volumetric acquisition.

The disclosed embodiments include an apparatus and method for widefield 3D fluorescence microscopy with a quantum entanglement light source. In an aspect, an example method includes generating a first set of photons and a second set of photons, wherein each of the photons in the first set is quantum entangled with a corresponding photon in the second set, directing the second set of photons toward a sample and simultaneously directing the first set of photons toward a first two-dimensional (2D) detector, detecting, from the sample, a plurality of photons at a second 2D detector, wherein the plurality of photons is produced in response to absorption and reemission, scattering, or reflection of the second set of photons by or from the sample, analyzing detections from the first and second 2D detectors to determine coincidence information, and determining one or more characteristics associated with at least a three-dimensional (3D) section of the sample based on collective detections at the first and the second 2D detectors, wherein the detections at the first 2D detector correspond to two spatial dimensions of the 3D section of the sample and the detections at the second 2D detector correspond to at least a third dimension of the 3D section of the sample.

In another aspect, an example system includes an idler arm comprising one or more optical components to receive and direct a first set of photons to a first two-dimensional (2D) detector, a signal arm comprising one or more optical components to receive and direct a second set of photons to a sample, and a second 2D detector positioned to receive and detect emitted or scattered photons from the sample in response to receiving the second set of photons, wherein each photon in the first set of photons is quantum entangled with a corresponding photon in the second set of photons, wherein information obtained from detections from the first 2D detector and the second 2D detector provide coincidence detection information to identify at least a subset of the first set of photons detected by the first 2D detector that have corresponding detections at the second 2D detector, and wherein the detections at the first 2D detector and the second 2D detector collectively enable a determination of a three-dimensional (3D) volumetric image of the sample.

BRIEF DESCRIPTION OF THE DRAWINGS

FIG. 8 plots the wavelength dependence from signal and idler for non-degenerate spontaneous parametric down conversion (SPDC).

FIGS. 9A and 9B are schematics illustrating an example of quantum entanglement and a parallel implementation, respectively.

DETAILED DESCRIPTION

Although fluorescence microscopy includes a powerful set of tools for biology, dynamic 3D imaging and phototoxicity remain challenges for biological imaging. Current 3D fluorescence imaging methods require sequentially scanning either of the optics and/or the sample, which imposes bias and distortion in the observations, limits the time resolution of the imaging system in 3D, and imposes peak excitation intensities that can cause phototoxicity and beaching. The current state-of-art lattice light sheet microscope is capable of 3D imaging at up to 1-2 volumes per second for a 200-300 nm resolution volume of 50×50×50 $\mu m^3$. However, the published observation of fast-diffusing single molecules still requires a static light sheet position, with the molecules diffusing in and out of the light sheet, losing full 3D information. Higher speed has been achieved, but with lower spatial resolution. For bioenergy applications, limited temporal resolution and photodamage impede the study of enzymatic processes such as cellulose degradation and microbial symbiosis in bioenergy systems.

Improved resolutions can also be achieved using quantum imaging which provides a set of tools that exploits quantum correlations such as the quantum entanglement of the electromagnetic field in order to image objects with a resolution or other imaging criteria that is beyond what is possible in classical optics. Entangled photons are used to form images, therein providing possibilities for a new paradigm of microscopy that overcomes tradeoffs among excitation intensity, spatial and temporal resolution. Examples of quantum imaging include quantum ghost imaging, quantum lithography, sub-shot-noise imaging, and quantum sensing.

Figure 1:
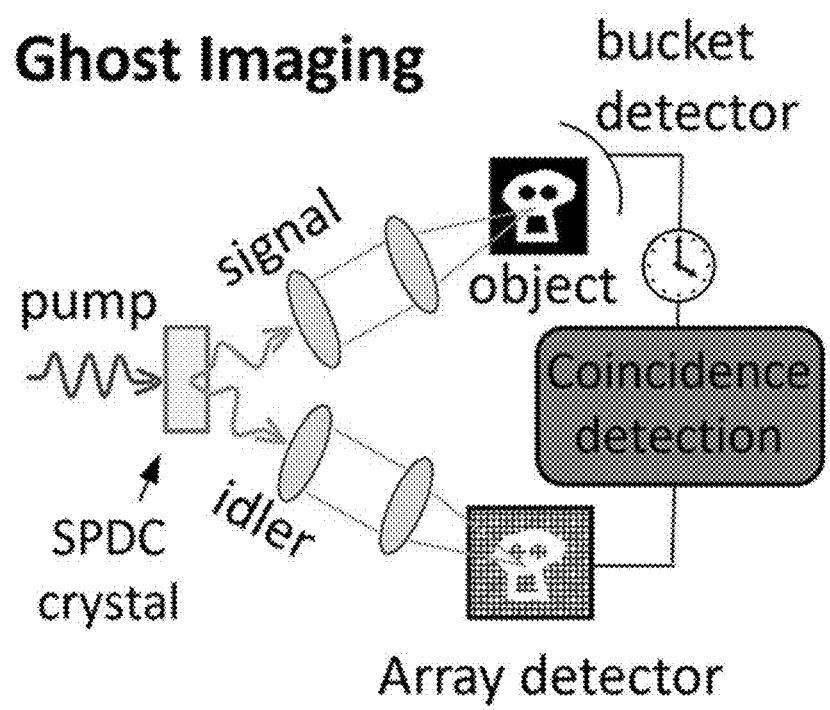
FIG. 1 is a schematic illustrating an example of ghost imaging.

The ghost imaging technique will be described using FIG. 1. However, it should be noted that FIG. 1 illustrates additional features that are not part of a traditional ghost imaging technique. Ghost imaging is typically implemented using two light fields, one of which interacts with an object and the second, separate light field, falls onto the imaging detector. This enables the imaging of an object using light that has never interacted with the object, and is based on the spatial correlations between the two beams.

As illustrated in FIG. 1, an apparatus for ghost imaging includes a source of entangled photons (termed "signal" and "idler" photons, which are strongly correlated in position), a signal arm through which the first light field (more specifically, the signal photon) is directed onto an object and then into a bucket detector, and an idler arm through which the second, separate light field (more specifically, the idler photon), is directed onto an array detector. The ghost imaging apparatus further includes a coincidence detection block that records the coincidence counts between the signal and idler photons.

In this example, the laser in FIG. 1 is configured to interact with a non-linear crystal, and spontaneous parametric down conversion (SPDC) produces pairs of entangled photons with each pair residing in a common coherent quantum state. The measurement of one photon can provide information about its entangled partner because they are highly correlated.

For instance, if a measurement is taken on a pair member (one of the two entangled photons), its wavefunction will collapse into a definite state, randomly. The other pair member will also have its wavefunction collapse into a definite state, instantly. Polarization states are commonly the observable used with entangled photons. For example, a wavefunction may be $$|\phi\rangle = \cos\theta|HH\rangle \pm \sin\theta e^{i\delta}|VV\rangle.$$

In this case, the polarization of the two photons is parallel, so that if one is measured as $|H\rangle$, the other necessarily will be measured as $|H\rangle$. If one is measured as $|V\rangle$, the other would be measured as $|V\rangle$. Quantum entangled photons can be generated over a wide range of wavelengths. Such entangled photons display the strongest correlations between two objects found in nature. These correlations are non-local in nature, which means regardless of separation in distance, if one member undergoes a change, the other member will be affected equally, instantly. As has been clarified theoretically and experimentally, information cannot be transferred in this way. However, comparison of the measured states after the fact show the correlation.

Continuing with the example illustrated in FIG. 1, the entangled pair of photons includes the signal photon and the idler photon, wherein signal photons that interact with the object are detected by a bucket detector, which triggers a 2D camera to register the arrival of its idler pair, producing the 2D ghost image of the object over time. Specifically, the position of the photon hitting the array detector is recorded only if its detection is coincident with the recording of the photon by the bucket (or single pixel) detector. That is, the signal photons have illuminated the object, and the idler photons, which are correlated with the signal photons, have been recorded by the array detector.

However, current ghost imaging implementations have failed to meet the needs of biosciences and bioimaging. Current implementations are typically bulky and include expensive cameras that are often impossible to customize, hard to synchronize with light sources, and can present excessive noise that degrades the image.

Figure 2:
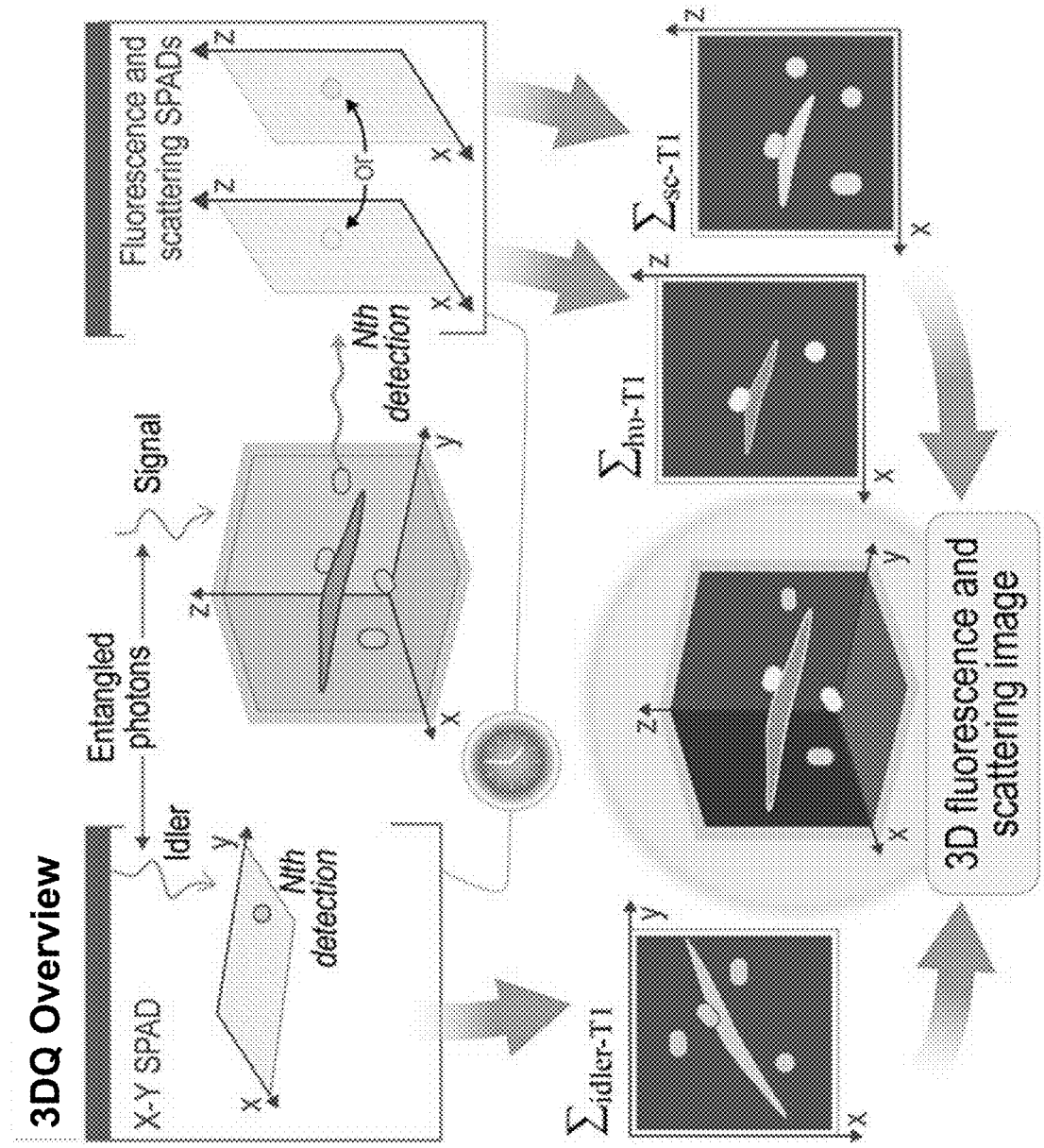
FIG. 2 is a schematic illustrating an example of widefield three-dimensional (3D) fluorescence microscopy with a quantum entanglement light source.

Embodiments of the disclosed technology leverage the ghost imaging principal and use quantum entanglement to collect time-correlated ("coincident") orthogonal 2D images from both the signal and the idler arms, and combine them to generate a 3D image. FIG. 2 illustrates this technique, which can be extended to fluorescence imaging and other imaging paradigms.

As illustrated in FIG. 2, a pair of entangled photons comprising the signal photon and the idler photon are, respectively, incident on a biological sample and a 2D X-Y photon-counting detector (e.g., a photon resolving number detector or a photon timing detector). In this example, the biological sample fluoresces and emits a photon that is incident on another 2D detector, e.g., either an X-Z fluorescence 2D detector or an X-Z scattering 2D detector. In contrast to the ghost imaging apparatus illustrated in FIG. 1 that uses a bucket detector and an array detector, the example in FIG. 2 uses two 2D detectors for the signal and idler arms, which advantageously enable a 3D image to be constructed. In an example, the 2D photon-counting detector can be a single photon avalanche diode (SPAD) detector. In another example, the 2D photon-counting detector can be a superconducting nanowire single-photon detector (SNSPD).

The 2D detector in X-Y and the 2D detector in X-Z are coupled using a coincidence detector that records the position of the idler photon hitting the 2D X-Y detector only if its detection is coincident with the recording of the fluorescence photon hitting the 2D X-Z detector. This enables each of the 2D detectors to generate 2D images or snapshots (e.g., denoted $\Sigma_{idler-T1}$ for the idler photon and $\Sigma_{sc-T1}$ for the signal photon incident on the scattering 2D detector in FIG. 2) that can be combined to generate a 3D fluorescence or scattering image or snapshot, which the ghosting imaging apparatus in FIG. 1 is unable to implement.

Some embodiments of the disclosed technology use two 2D photon-timing detectors to monitor the fluorescence excitation and photon emission event simultaneously, with each detector measuring 2 observables with a time stamp. By correlating the detection times on the two detectors, the spatial coordinates and emission wavelength of each detected fluorescence photon can be correlated. As discussed above, this is enabled by quantum entangled photons, where the signal photon excites fluorescence in the biological sample measured by the first detector, and the entangled idler photon provides correlated information in the second detector.

Other embodiments of the disclosed technology leverage quantum entangled light interacting with a sample to enable the simultaneous detection of different observables. As discussed above, the simultaneous detection of x, y, and z positions of the fluorescence absorption and emission, or of a scattering process can be performed. In another example, the time difference between the detection in the signal arm and the idler arm is a measure of the duration of the fluorescence excited state. With quantum-entangled light, the duration of the excited state can be measured without a pulsed laser, which is the traditional approach. In yet another example, the wavelength of the light of the detected photon in either the idler or signal arm can be measured (in place of x, y, or z) by using a spectrometer.

The example illustrated in FIG. 2 implements fluorescence imaging, wherein an object (e.g., a biological sample) is illuminated with light with a certain wavelength, which is absorbed by the sample (fluorophores), and remitted at a different wavelength. Fluorescence imaging can be implemented in microscopy, spectroscopy or other types of imaging systems. It should be noted, however, that the disclosed techniques are also applicable to non-fluorescence imaging techniques. The described embodiments advantageously allow for the nanosecond-scale time delay caused by the fluorescence process. The signal photon excites the fluorophore, and then a new photon is emitted after a characteristic relaxation time. This timing component is used to differentiate among different fluorescence processes, and even scattering. While this delay limits the entangled photon rate to $\sim 10^9$ photons per second for standard entanglement, higher orders of entanglement will enable this limitation to be overcome. For example, in existing techniques, the output of SPDC sources is less than $10^8$ entangled photons per second, and typically in the infrared range, whereas the described embodiments produce an entangled photon source with a higher output in the blue-green range.

In some embodiments, the 3D quantum (3DQ) microscope uses high-speed 2D detectors (such as the X-Y SPAD detector and X-Z fluorescence or scattering SPAD detector illustrated in FIG. 2. In the embodiments described, any high-speed 2D detectors, if coupled, could be used in positions of the 2D SPAD detectors) capable of correlating the arrival of photons at the signal and idler detectors ("coincidence counting"). In an example, a SPAD detector array is capable of recording the arrival time of photons with resolution of 50-100 picoseconds and performing hardware-based coincidence counting. These SPAD detector arrays are also programmed for high-speed time delay analysis to enable resolved scattering and fluorescence lifetime imaging without the requirement of a pulsed laser and its high instantaneous photon flux. Scattered photons will arrive at the detector faster and can be used to image unlabeled features. Furthermore, nanosensors can be engineered to encode information on an $O_2$ level and are differentiated from other fluorophores in the sample based on fluorescence lifetime.

One of the benefits of the embodiments described herein includes increasing the rate at which 3D images can be acquired in live systems while reducing peak intensity and the total fluence impinging on the sample to produce an image. The speed of analysis comes from quasi-simultaneous ("snapshot") volumetric imaging, which requires no scanning. In an example, the full sample area is illuminated until sufficient counts are registered to form an image, which could be under a second when using a $10^9$ entangled photon per second source even without unusually high fluorescent labeling. Importantly, there is no time penalty for collecting fluorescence, fluorescence lifetime and scattering (darkfield), because all emissions are occurring within the illumination window and can be separated by wavelength or timing. The reduction in peak intensity is due to the wide-field illumination, in which it has been shown that phototoxicity is lower because the illumination power is spatially spread to avoid the local instantaneous high-dose illumination. The reduction in fluence is due to snapshot full volume multi-modal detection using a signal from the full volume and only counts the correlated photons, thus increasing the SNR and reducing the total number of photons needed.

In some embodiments, the 3DQ microscope is employed in dynamic systems where components need to be tracked with multiple modes and channels at high speed. In an example, the 3DQ can be used to study the dynamics of microbial symbiosis in bioenergy algal ponds and plants. In algal ponds, the 3DQ microscope may track algae, bacteria, and fluorescent reporters in water—where the temporal scale of interaction is potentially milliseconds and the spatial scale is tens of microns. For bioenergy plant studies, the 3DQ microscope enables the mapping of root, hyphal, and matrix ("transparent soil") structures and tracking bacteria, viruses, and chemical conditions to study the dynamics of wetup events in the rhizosphere and hyphosphere. These dynamic events will also benefit from imaging relatively large volumes at high speed. The ability of the 3DQ microscope, as described in the embodiments herein, to image the dynamics of these systems would generate completely new knowledge on the microscale ecology of these organisms.

Example embodiments of the disclosed technology are characterized, in-part and among other features and benefits, by the following:
  (1) an optical fluorescence system to capture simultaneous imaging data across x-, y-, z-axes;
  (2) production of high-power quantum entangled light sources (with up to 109 pairs/s); and
  (3) detection of coincidence using two 2D high-speed photon-timing detectors, e.g., SPAD detector arrays or SNSPD arrays.

Embodiments of the disclosed technology reduce the tradeoff between scanning speed and phototoxicity by eliminating scanning by getting more information from each photon. Temporal resolution and phototoxicity are inextricably linked by the fact that the number of photons detected from a feature is a fundamental reference for image quality. To image faster requires more photons to be detected faster, which for a given illumination scheme, can only result from increasing photon flux, that is, the number of photons hitting the feature in a given moment. Phototoxicity is caused by the production of free radicals, particularly in the fluorescence process. These free radicals can impair or kill live cells and bleach fluorophores. Imaging speed is linked to phototoxicity because as the photon flux increases, the production of radicals increases nonlinearly.

An additional factor in phototoxicity is the photon fluence, or the number of photons that illuminate a given section of the sample while producing the full image. Photon fluence affects phototoxicity because the production of free radicals is linearly related to the duration of exposure to a given photon flux. Therefore, the number of detected fluorescence photons per incident photon is another metric to consider for phototoxicity; for simplicity, this is referred to as "photon efficiency". By this metric, standard confocal microscopy and spinning disk confocal microscopy have low photon efficiency because the full depth of the sample is illuminated for each Z-plane, while fluorescence is only registered for the focal point. Standard confocal microscopy also has a relatively high maximum photon flux because all of the signal for a feature in the sample comes from a fraction of the total illumination time. Additionally, commonly used confocal fluorescence lifetime imaging requires a pulsed laser that increases instantaneous photon flux, leading to increased phototoxicity.

An existing implementation of a fast, photon-efficient, and low peak-flux 3D fluorescence microscopy method is lattice light sheet (LLS) microscopy, which scans a linear array of Bessel beams through a single plane of the sample, orthogonal to the widefield imaging objective. LLS microscopy minimizes phototoxicity by distributing the illumination, only exciting fluorophores in the imaged plane, thereby maximizing photon efficiency and reducing peak photon flux. LLS microscopy can also produce 3D images relatively fast because the time to laterally scan the lattice light sheet is negligible due to widefield detection, so the primary scanning time is only in the Z direction. As mentioned above, this method takes approximately one second to form an image in a 50×50×50 µm volume.

Embodiments of disclosed technology can be configured for fluorescence imaging that is faster than state-of-art LLS microscopy with lower peak photon flux and higher photon efficiency, even with multimodal detection (scattering and fluorescence lifetime). In an example, the disclosed 3DQ microscope acquires volumetric fluorescence images at high speed, where the images are formed by correlating pairs of entangled photons on orthogonal 2D detectors.

Overview of Principles and Technical Solutions for 3DQ Microscopy

Extended depth-of-field. In some embodiments, there are two orthogonal views of the same event, which advantageously enables having the largest possible 3D observation volume with high resolution in all three dimensions. The issue that may limit the size of the volume will be the depth of field of the microscope objectives. Microscope objectives have wide fields of view, but the depth of field is determined by the fundamental geometric and wave optics. When the x-, y-, and z-positions of the absorption and subsequent emission events of a fluorescent molecule are simultaneously measured, the resolution of the microscope will depend on whether the 3D location of that event is in focus on both detectors. Some embodiments are configured to have high lateral resolution but an extended depth of field. In standard microscopy, the depth of field of an objective is a depth over which objects will remain in focus, and given by $$z_{field} = \frac{\lambda n}{(NA)^2}.$$

Herein, $z_{field}$ is the total depth of field, $\lambda$ is the wavelength of light, n is the index of refraction of the immersion medium or air, and NA is the numerical aperture of the objective. The lateral resolution, the full diameter of the Airy disk of the focus, is related to the NA by $$d_{Airy} = 1.22 \frac{\lambda}{NA}.$$

Examples of these parameters for several objectives are shown in Table 1.

TABLE 1

Example parameters for microscope design

| NA | n | $d_{Airy}$ (µm) | $z_{field}$ (µm) | % collected |
|---|---|---|---|---|
| 0.05 | 1 | 13 | 213 | 0.06 |
| 0.14 | 1 | 4.6 | 27 | 0.5 |
| 0.28 | 1 | 2.3 | 6.8 | 2 |
| 0.55 | 1 | 1.2 | 1.8 | 8 |
| 0.7 | 1 | 0.93 | 1.1 | 14 |
| 0.95 | 1 | 0.68 | 0.6 | 34 |
| 1.2 | 1.33 | 0.54 | 0.5 | 28 |
| 1.4 | 1.5 | 0.46 | 0.4 | 37 |

As shown therein, for increasing NA, the lateral resolution improves (i.e., the diameter of the Airy disk decreases), the depth of field decreases, and the percentage of the emission collected by the objective increases. For high lateral resolution, it is desirable to have the highest numerical aperture possible. In some embodiments, this parameter limits the depth of field, which can adversely affect the resolution for events outside the center of the focal plane. Since the described embodiments are imaging two orthogonal planes, the interplay of these tradeoffs affects the size of the detection volumes available with quality imaging.

Although the simplest method for extending the depth of field is to use a lower NA, a trade-off in terms of resolution and alternatives exist for both the excitation and emission. In an example, Bessel beams allow for extended focal length imaging, as do extensions of the Bessel beam techniques such as LLS imaging. On the emission side, annular ring masks can extend the depth of field for microscopy. Additional methods include point spread function (PSF) engineering approaches that allows for the use of full aperture, which provides a way to increase the resolution and depth of field without sacrificing detection efficiency.

Illumination power. The number of fluorescence detections relative to noise is central to determining imaging tradeoffs. With entangled light, the background noise is expected to be largely eliminated by coincidence counting, and the primary noise component of 3DQ microscope detections will be shot noise. Shot noise is resultant from detections of single photons that follows Poisson distribution, and the corresponding signal to noise ratio (SNR) is expressed as SNR=$\sqrt{N}$, where N is the average number of detected photons in each acquisition. In an example, N=10 is a reasonable estimation of target detection count to identify position of a fluorophore or an object from a snapshot with SNR≈3.16.

In one example, a common imaging task is the fluorescence detection of GFP labeled bacteria $E.\ coli$. Herein, the molar extinction coefficient $\epsilon$ is 55000 mol·(L·cm)$^{-1}$ for GFP with 496 nm photons, and the absorption, $\sigma$, is $2\times10^{-16}$ cm$^2$ calculated with the relation $\sigma=3.824\times10^{-21}\epsilon$. The fluorescence protein attached to specific proteins can reach $10^4$ copies per $E.\ coli$. Assuming $10^4$ GFP molecules expressed per $E.\ coli$, with fluorescence quantum efficiency of 0.5 for the fluorophore, fluorescence collection efficiency of 0.18 by the collection objective, and detection efficiency of 0.27, an illumination fluence of $7.9\times10^{-5}$ J/cm$^2$ is required to obtain the targeted detection rate of 10 photons for a single bacterium. A source with that achieves $10^9$ entangled photons/s could reach this fluence within a cross-sectional area of 20 µm×20 µm in one second. Using a higher labeling density or decreasing the area of the excitation increases the rate proportionally.

Alternatively, scattering provides another route for detection. Multiple live-cell imaging techniques are based on sensing scattering or refraction due to small changes in index of refraction within bacteria and other cells, including phase contrast, darkfield, and differential interference contrast (DIC) microscopy. Of particular interest for fast 3D imaging are techniques, especially holographic phase imaging, which can be used to monitor the swimming of bacteria over hundreds of micrometers in solution. Using image analysis, phase patterns can determine the depth of the bacteria at each time point.

In some embodiments of the 3DQ microscope, large angle scattering, which is nearly perpendicular to the excitation light propagation direction, is observed. For bacteria, light scattering cross sections per bacteria can be estimated using the CFU/mL/OD$_{600}$ values, which range from $5\times10^7$ to $10^9$, depending on the bacteria. The corresponding range in cross sections is $2\times10^{-9}$ to $5\times10^{-8}$ cm$^2$. Although these are significantly higher than the cross sections for fluorescence (even with $10^4$ GFP molecules), scattering is not isotropic and at the steep angles proposed here for volumetric imaging have scattering intensities $10^{-3}$ to $10^{-4}$ times the intensities for shallow angles. Even considering this, the scattering is expected to provide a higher detection rate than fluorescence.

Figure 3:
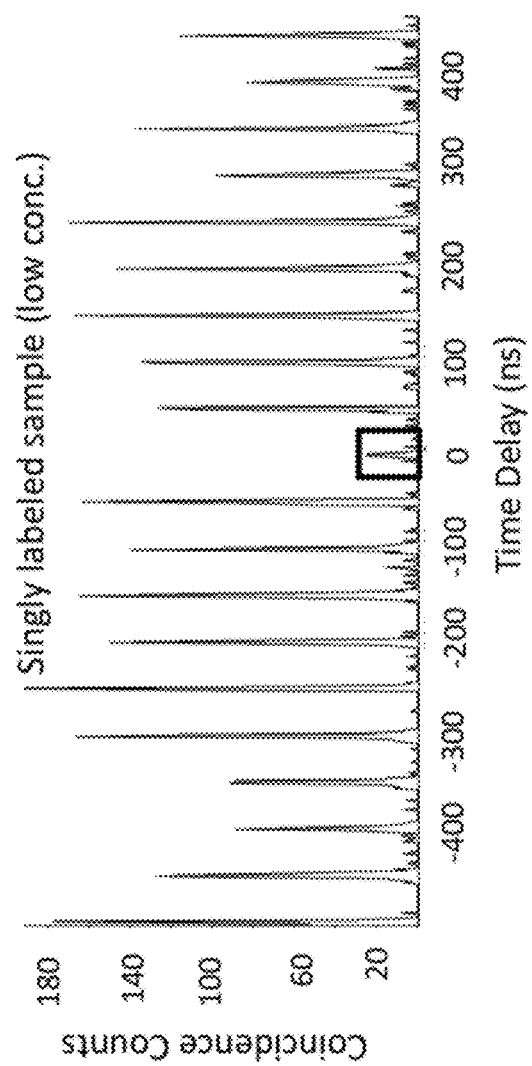
FIG. 3 illustrates an example of high time resolution photo coincidence measurements.

Single photon counting approach for fluorescence and scattering detection. Single photon-based approaches to fluorescence provide the highest amount of information about fluorescence photons. Some embodiments include multi-dimensional approaches for high time resolution (50 ns) single-molecule fluorescence resonant energy transfer (FRET) that measure the fluorescence lifetime of four channels, including donor and acceptor channels split by polarization. In this way, the dynamics of protein folding and protein-DNA can be monitored on multiple timescales. Other embodiments include techniques in fluorescence-correlation spectroscopy to monitor interactions that encompass timescales from picoseconds to seconds. In an example, and as illustrated in FIG. 3, non-classical, anti-bunched light generated by single fluorescence molecules was used to determine the stoichiometry of biophysical interactions.

The above described single photon—counting timing, analysis, and correlation techniques are leveraged in the 3DQ microscope. Single photon—timing with two synchronized 2D detectors is used to obtain x-, y-, and z-measurements along with the absolute arrival time of the detected photons and the time difference between the excitation photon (as measured by the idler arm) and the emitted photon. Although single photon processing has been used in ghost imaging for bucket detectors, the described embodiments extend this idea to 2D high-speed photon timing detector arrays. Quantum entanglement advantageously allows for measurement of additional dimensions for each photon absorption.

In some embodiments, the first 2D photon timing detector array is configured with at least one spatial dimension and the second detector array is configured with at least two spatial dimensions. For example, FIG. 2. illustrated the idler photon being incident on the X-Y plane and the fluorescence photon, i.e., the signal photon after interacting with the biological sample, being incident on the X-Z plane. A common dimension between the two detector arrays advantageously enables the 2D images generated from each detector array to be aligned, so the 3DQ microscope can produce a 3D image or snapshot of the biological sample based on a property (e.g., fluorescence, luminescence, or scattering).

Reliability of coincidence counts. In ghost imaging, only a small portion of signal photons normally interact with the sample and produce either scattered photons or fluorescence photons to arrive at the signal arm detector. However, a much larger number of idler photons would arrive at the corresponding idler arm detector. Such an imbalance requires the elimination of most of the idler photons in the detection for time-correlation based coincidence counts. For fluorescence detection, if multiple photons are detected in the idler arm within the fluorescence lifetime of 1-5 ns, there will be uncertainty as to which idler photon corresponds to the fluorescence photon, causing errors.

To reduce this problem, the idler photon count rate must be lower than the reciprocal of the fluorescence lifetime by a minimum factor of 10 assuming tolerance of 10% error rate. Further increases in the count rate can cause a distortion similar to the pile-up effects in time-correlated single photon counting. Some embodiments of the disclosed technology address this problem by having each of the 2D detectors monitor a common axis, thus producing redundancies that significantly reduce the ambiguity in identifying coincidence counts. In particular, a tolerance of n-fold higher power entangled light sources (or equivalently, an n-fold increase in the idler photon count rate) can be enabled in the 3DQ microscope without causing the aforementioned distortions, where n is the number of distinguishable y-pixels in the 2D detectors. Furthermore, mitigation strategies are deployed to take advantage of the nature of polarization change of photons upon interaction with a fluorophore. In contrast, scattering count rates are only limited by the time resolution of the detectors (e.g., 50 ps) that will allow the use of significantly higher power for entangled light sources.

Examples of High-Power Entangled Photon Sources.

The operation of the 3DQ microscope at high time resolutions uses a bright source of entangled photons—pairs of photons in a single coherent quantum state produced at high rate. Entanglement can be generated by different means, including nonlinear crystals, quantum dots, and four wave mixing. Some example embodiments described herein employ spontaneous parametric down conversion (SPDC), which is a second-order optical effect in which pump photons incident on the nonlinear crystal are converted spontaneously into two photons, at lower frequency, called the signal and idler outputs. The splitting of the pump photon into signal and idler arms occurs in accordance with conservation laws of momentum and energy, and the non-linear crystal needs to be cut at specific angles in order to produce efficient SPDC depending on the material and type of nonlinear conversion efficiency desired.

Critical phase-matching conditions can be met in a few common configurations. In Type I SPDC, the signal and idler share the same polarization direction that is perpendicular to the pump, whereas in Type II SPDC, the signal and idler have orthogonal polarizations. In Type 0 SPDC, the signal, idler, and pump all share the same polarization. Type II SPDC is attractive in many applications that require orthogonal polarizations and is the most common configuration for quantum entanglement experiments using SPDC. For Type II SPDC, operating at a pump wavelength of 400 nm, pair count rates of up to $4\times10^7$ per second were reported with a BBO ($\beta$-Barium Borate) crystal. The photon sources used in some of the embodiments of the disclosed technology produce $10^9$ pairs per second, which is in line with the highest count rate reported to-date for a Type 0 SPDC using a PPKTP crystal which is $10^9$ pairs per second.

In some embodiments, visible wavelengths are used for excitation of fluorescence, which therefore requires a UV pump source so that the photon energy may be split into two visible photons. Typically, UV pump wavelengths are used in conjunction with a Type I SPDC, since dispersion by the non-linear crystal complicates construction of Type II SPDC entangled photon source and luminescence can interfere with the entangled output, although there are routes for mitigation. In an example, the pump wavelength can be the 266 nm. In another example, a non-degenerate SPDC at 355 nm pump wavelength can be used to generate 460 nm signal and 1550 nm idler. In yet another example, the 266 nm wavelength can be used, and split into two non-degenerate wavelengths, 495 nm and 575 nm. In the latter example, the two wavelengths are chosen to match GFP and mCherry fluorescent proteins, but they can be tuned to match any application. In yet other examples, other pump wavelengths, crystals, and fluorescence probes are used to for specific applications.

Figure 4:
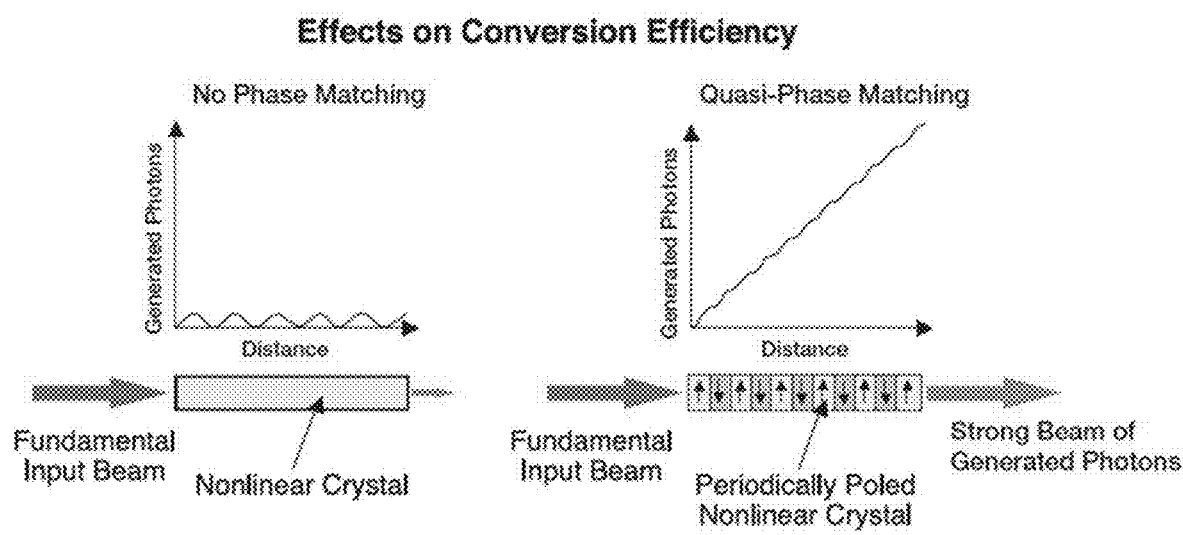
FIG. 4 illustrates an example comparing conversion efficiency for a nonlinear crystal and a periodically poled nonlinear crystal.

As illustrated in FIG. 4, SPDC is generated most efficiently with a periodically poled (PP) nonlinear crystal. The inverted portions of the crystal yield photons that are 180 degrees out of phase with the photons that would have been created if the crystal was not poled. By choosing the right periodicity of the crystal orientation, as illustrated in FIG. 4, the newly generated photons will always interfere constructively with previously generated photons. As a result, the number of generated photons will grow as light propagates through the PP crystal, yielding a high conversion efficiency of input to generated photons.

In some embodiments, sum-frequency generation, which is the reverse process to SPDC, can be leveraged to design and implement the SPDC process. In an example, KDP crystals for $4^{th}$ harmonic generation to 263 nm and CLBO crystals for $5^{th}$ harmonic generation to 211 nm, which can withstand high energy ns laser pulses, can be used with correct phase matching conditions, to achieve optimal SPDC generation rates.

Examples of Photon-Counting Detectors

High sensitivity photodetectors without spatial information include photomultiplier tubes (PMTs), avalanche photodiodes (APDs), and hybrid photodetectors. These detectors can be run in photon-counting modes, where each photon detected leads to electrical pulses that can be counted or timed. To achieve spatial information, a scanning mechanism is generally used, thus making acquisition very slow due to its sequential nature.

To solve this problem, multi-channel plates (MCPs), multi-anode APDs (MA-APDs), and scientific CMOS active pixels-sensor (sCMOS APS) technologies were developed. While MCPs can capture singe photon events with high time accuracy and low noise, they are bulky and require highly expensive vacuum encasing. AM-APDs are a valid alternative but the analog interface may be complex or could degrade timing performance. sCMOS APS is not designed for high timing resolution.

Existing implementations of quantum ghost imaging have used single-pixel photon-counting detectors ("bucket detectors") and gated CCD cameras. In the CCD camera implementations, the bucket detector triggers the CCD camera so that only photons correlated with detections in the bucket detector are measured. These cameras have very short gating times (e.g., ~200 ps), high granularity of control (e.g., ~10 ps), and a megapixel format. However, gated CCDs are bulky and expensive cameras that are often impossible to customize and hard to synchronize with light sources. While an alternative is the use of electro-multiplied CCDs (EMCCDs), these devices can present excessive noise that degrades the image; furthermore, EMCCDs are also costly.

Problematically, all these solutions require external image processing through fast interfaces, which are expensive and power hungry, often hindering the achievement of video speed in large formats.

Figure 5:
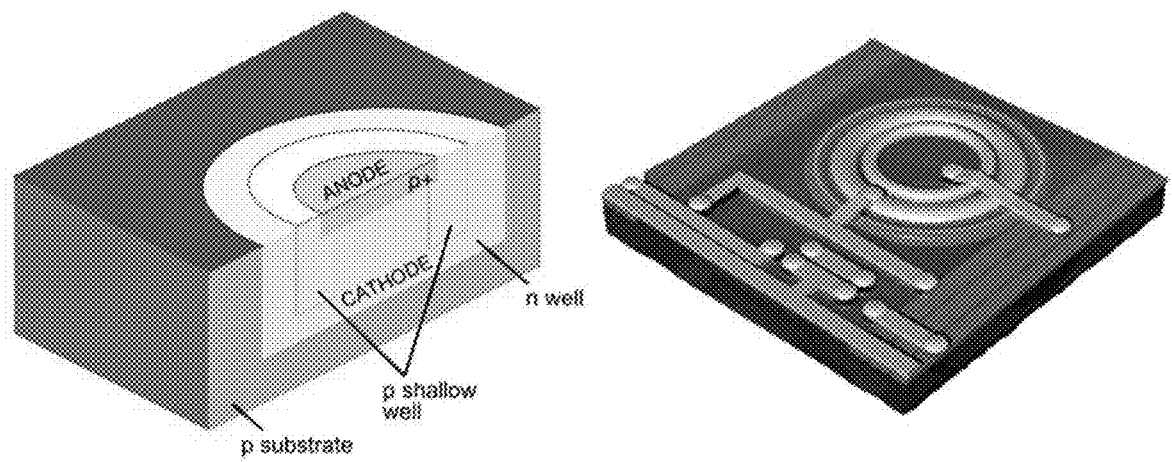
FIG. 5 illustrates an example of a single photon avalanche diode (SPAD).

Some embodiments of the disclosed technology use 2D photon-timing detectors. In such detectors, the arrival time and spatial position of each detected photon are recorded. For 2D detectors, traditionally frame-based detectors have been used for high sensitivity applications (emCCDs, sCMOS detectors, and 2D arrays of APDs). Although with triggering, these may be used, in some cases, for coincidence measurements with entangled photon sources, the most flexible approach measures the time of arrival and spatial position of each detected photon with high sensitivity. Two examples include single-photon avalanche diodes (SPAD) arrays (as illustrated in FIG. 5) and spatially sensitive MCPs.

In some embodiments, the 3DQ microscope is implemented using large-format SPAD image sensors with gating and/or integrated time-to-digital converters (TDCs). These devices are much more versatile than their predecessors and easy to synchronize with external triggers both optically and electrically. SPAD image sensors are fabricated in CMOS technology and thus inherently low-cost, even though they are capable of high timing resolution (e.g., 100 ps), high granularity of control (e.g., ~5 ps), low noise (e.g., 1 count-per-second), and high sensitivity in a wide range of wavelengths. In an example, gated SPAD cameras with 1 megapixel may be used.

In some embodiments, large-format SPAD image sensors are used and reconfigured to implement complex pre-computations necessary for image interpretation. This choice reduces the requirements on interfaces, whereas moderately fast standards, such as PCIExpress, can be used in combination with relatively inexpensive image processing units. This advantageously achieves high rates (video or better) with full format pictures, which have never been achieved in existing ghost imaging applications. This capability enables the measurement of the spatial position of an absorption and emission event in the signal arm simultaneous with the idler arm measurement.

Examples of Microbe-Host Interactions in Bioenergy Research

Embodiments of the disclosed technology can be used to study microbe-host interactions for bioenergy research related to, for example, biofuels. Microbe-host interactions are fundamental to the function of a wide range of biological systems, including biofuel algal ponds and bioenergy plants. In an example, algae are known to grow faster in the presence of bacteria, and in the case of plants, beneficial arbuscule mycorrhizal fungi (AMF) are hypothesized to rely on bacteria to access nutrients.

Imaging microbe-host interactions presents significant challenges. Individual bacteria are typically difficult to image because most are on the scale of 1 μm in length and have an index of refraction of ~1.4. Furthermore, motile bacteria in water can potentially move 100s to 1000s of body lengths per second, and Brownian motion will influence the movements of all bacteria. Algae are typically larger than bacteria and can also be motile, but *P. trichornutum*, for example, move planktonically by changing their buoyancy and by gliding when attached to surfaces. At ~10 microns in length and a couple microns in diameter at their midpoint, they are still subject to Brownian motion. Fungal hyphae are millimeters in length and 10s of microns in diameter and are not known to move beyond growth. These challenges are compounded when imaging host-bacterial interactions at the sub-micron to 10s of microns scale in 3D; tracking movement in 3D requires even higher-speed imaging capability to capture high-speed interactions and avoid scanning artefacts.

To address the microbe-host interaction imaging challenge, some embodiments can be configured to acquire high-speed "snapshot" images, wherein the images are acquired at millisecond time frame rates using diffraction-limited optics—therein having the ability to resolve movements of individual bacterial cells.

In addition to imaging the bacteria and the host, embodiments of the disclosed technology image reporters of interactions, such as micro-scale changes in chemistry surrounding bacteria and hosts. Leveraging the real-time imaging capabilities of the 3DQ microscope, $O_2$ nanosensor reporters that can visualize dynamic chemical gradients in water or transparent soil are implemented. This is achieved by configuring the disclosed embodiments to track the bacteria, the hosts, and the reporter simultaneously. In an example, the 3DQ microscope simultaneously provides fluorescence lifetime and darkfield imaging. The fluorescence lifetime imaging allows fluorophores—chlorophyll, GFP, and the $O_2$ sensor—to be differentiated based on the duration of their excited state post photon absorption. Darkfield imaging enables the tracking of all components of the system. The simultaneous acquisition of all of this information results in no lost time switching between modalities and advantageously enables the detection of 3D chemical gradients in concert with microbial movement in real time.

Example Embodiments of 3DQ Microscopy

As described earlier, the embodiments described herein provide 3DQ microscopy with at least the following characteristics:

An optical fluorescence system. Some embodiments include an optical imaging system that uses the entangled photon sources and 2D photon timing detectors to obtain multi-dimensional information for each detected photon pair. The nature of entangled photons can be combined with the imaging configuration to obtain 3D location coordinates along with the time tag of each photon. In addition, the fluorescence lifetime can be characterized using the time delay between the idler photon and the fluorescence photon resulting from the absorption of the signal photon. Other embodiments can be configured to measure large angle scattering from the sample, rather than fluorescence, providing additional observables in three dimensions. Thus, multi-dimensional information for biological imaging with 'snapshot' 3D acquisition can be obtained without scanning.

Figure 6:
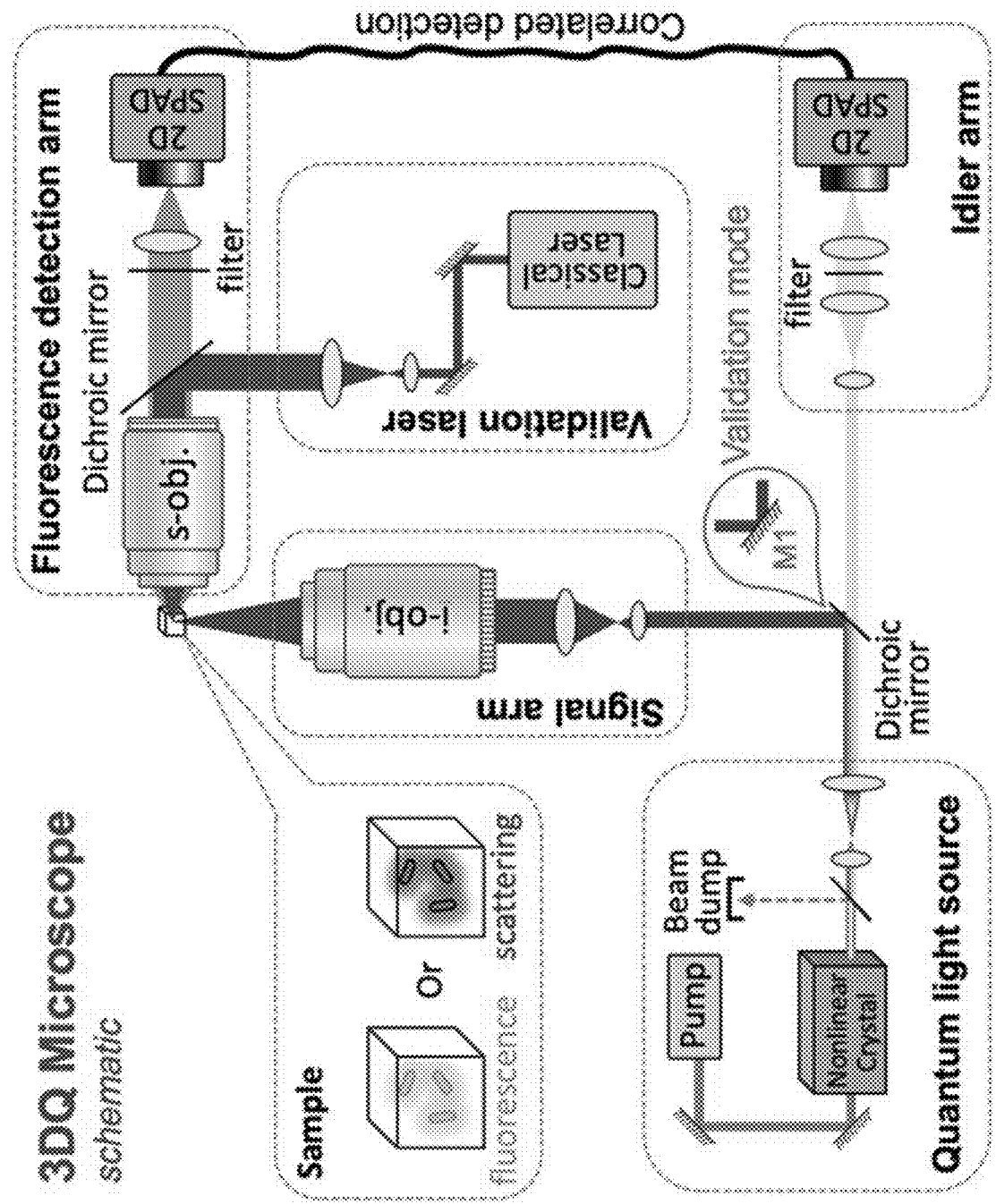
FIG. 6 is a schematic illustrating an example optical imaging system for a three-dimensional quantum (3DQ) microscope.

An example of the optical imaging system is illustrated in FIG. 6. As illustrated therein, the image formed by a 3DQ microscopy system by the idler photons can be interpreted as an image formed by a classical microscope with a highly similar instrument configuration, with the only difference being the entangled photon generating crystal being replaced by a mirror (in the case of the classical microscope).

As shown in FIG. 6, the light path of the imaging system includes the fluorescence detection arm, the signal arm and the idler arm. In an example, the fluorescence detection arm can be constructed to be identical to a classical widefield fluorescence microscope using CW laser excitation. This detection will produce the image of the sample in the XZ-plane. The signal arm and idler arm can then be constructed with a mirror (M1) placed in position of the BBO crystal to implement a 'validation mode' as shown in FIG. 6. This way, the construction of the two arms will be identical to a classical fluorescence microscope with orthogonal excitation and detection, such as is commonly used in selected plane illumination microscopy (SPIM) systems. The idler arm images the sample in the XY-plane. The combined XZ-plane and XY-plane imaging provides the volumetric imaging capability of the system. The sample stage can be implemented by modifying designs for light sheet microscopy according to the specific needs of the 3DQ microscope. The sample holder can be placed on a 3-axis stage for precise adjustment of the sample position.

Figure 7:
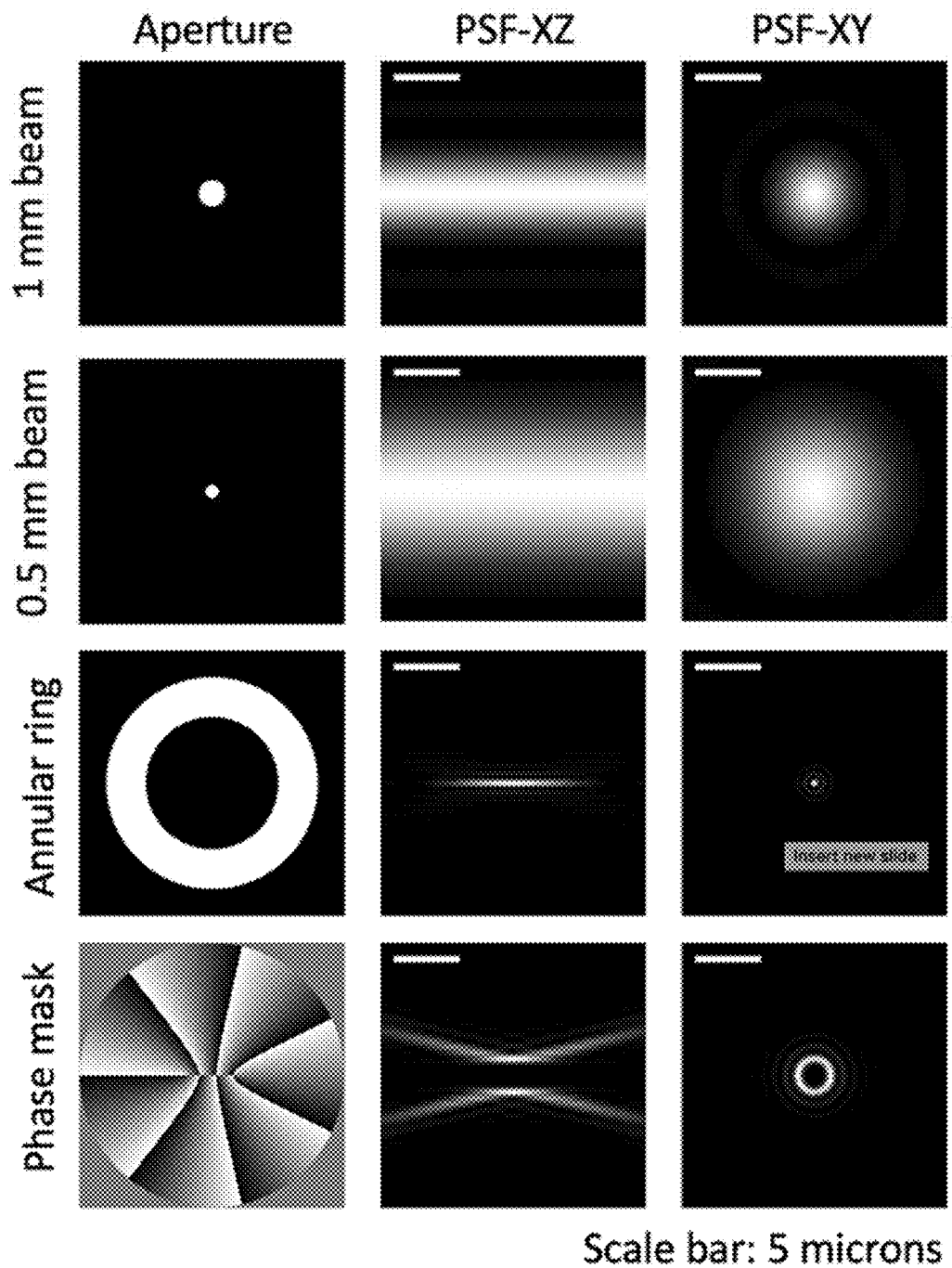
FIG. 7 illustrates an example of engineering a pupil function to achieve volumetric illumination and detection with an adjustable depth of field for an objective.

After the alignment is configured, the pupil-function can be engineered to achieve volumetric illumination and detection with adjustable depth of field for each objective. FIG. 7 demonstrates four different schemes calculated with parameters of a commercially available water dipping objective (0.67 NA, and 10 mm aperture size, and 3.74 mm working distance), and 520 nm wavelength of light similar to the yellow fluorescence protein (with absorption peak of 514 nm and the emission peak of 527 nm). Point spread function (PSF) engineering strategies can be used to further optimize the detection efficiency. This scheme allows for adjustable excitation and detection volumes of up to tens of microns. Similar pupil function engineering can be applied to both the signal arm objective (s-obj.) and the idler arm objective (i-obj) with independent design and optimization, and the flexibility allows for proper balancing between the trade-offs among available excitation powers of entangled photons and emission from fluorescence photons, different sample scales, detection efficiency, etc.

In some embodiments, the ability of the imaging system to measure entangled photons can be validated by using two APD detectors placed in positions of the XY- and the YZ detector, respectively. In this example, the beam size of both signal and idler beams can be expanded so that the signal- and idler-photons are both tightly focused into the corresponding APD. The detection measurements apply coincidence measurements using high time resolution photon antibunching measurements to determine the stoichiometry of biophysical interactions, wherein the positive correlation peak confirms the measurements of entangled photons on two separate arms.

In some embodiments, the spatial correlation of signal photons and idler photons can be characterized by (1) adjusting the size of the signal and idler beams to achieve wider detection spot in both arms, creating in a condition where each APD is only sampling a sub region of the entangled photon pairs, and (2) by displacing the APD position with micrometer precision to determine the spatial correlation cut-off distances. The corresponding magnification will be adjusted for each arm to achieve optimal coincidence measurements that matches the spatial sampling geometry of the 2D SPAD arrays.

In some embodiments, the 3DQ microscope can incorporate a standard-power entangled light source generated through non-degenerate Type I SPDC crystal, with a pump wavelength of 266 nm. In an example, the incorporation can be done by replacing the mirror (shown in 'validation mode' of FIG. 6) with the corresponding light source while situating the dichroic mirror in position of M1; mirror relay optics can be added to the signal and idler arms for small angle adjustment. The entangled photon pairs pass a dichroic mirror and split into (a) the signal arm for fluorescence excitation that eventually lead to fluorescence photon detection labeled as the XZ plane, and (b) the idler arm for the dual orthogonal detection labeled as the XY plane. The signal photons are absorbed at the sample and yield fluorescence photons with nanoseconds of delays from the absorption event, and the fluorescence photons are collected through the detection objective (orthogonal to the excitation objective) in the fluorescence detection arm to form fluorescence imaging detection in the XZ-plane. Darkfield imaging detection can be formed with scattered photons in the fluorescence detection arm by removing the bandpass filter.

For both fluorescence and darkfield imaging configuration, the idler arm will form detection events in the XY-plane of the entangled idler photons of the signal photons that are either (a) absorbed by the sample to generate fluorescence imaging detections or (b) scattered by the sample to generate darkfield imaging detections. The time differences between the time correlated fluorescence- and idler-photon pairs readily encode information for the fluorescence lifetime of the given fluorophore, and can be extracted using analytical tools.

In some embodiments, fluorescent beads that encapsulate well-characterized fluorophores can be used to validate 3D volumetric fluorescence imaging and fluorescence lifetime imaging capability of the 3DQ microscope. In other embodiments, strongly scattering nanoparticles can be used to validate 3D volumetric darkfield imaging using scattered photons. In these embodiments, the correlations of the arrival time and the Y-position coordinates between the fluorescence (or scattered) photons detected in the YZ-plane and the idler photon detected in the XY-plane determines the photon pairs, one being the fluorescence photon generated by the corresponding entangled signal photon (or the scattered signal photon) and the other one being the idler photon. Each detected photon pair yields a set of 3D-coordinates of the position of the fluorescence absorption and emission event (or the scattering event), indicating the position of the fluorophore (or the scatterer), and therefore, the sample.

Additionally, in the case of fluorescence-imaging mode, the time tag of the corresponding idler photon indicates the fluorescent absorption event, and the time tag of the fluorescence photon indicates the fluorescence emission event. Comparing both time tags enables additional analysis of the time delay between fluorescence absorption and emission events, leading to the measurements of fluorescence lifetime of the fluorophores, which can be engineered to encode extra information such as pH, Ca2+, K+ and glucose level in the sample.

A high-power quantum entangled light source example. Some embodiments of the disclosed technology use a High Yield Entangled Photon Source (HYEPS), which can be configured to produce up to 109 entangled photon pairs per second in the visible range for use in the 3DQ microscope. In an example, this high-power output can be produced at 800 nm with a 400 nm pump laser. In another example, entangled photons in the visible range can be produced using a UV pump laser.

In yet another example, FIG. 8 plots the wavelength dependence between the signal and idler photons of entangled pairs produced by a non-degenerate Type I SPDC pumped by a 266 nm CW laser with 300 mW output. As illustrated therein, an entangled pairs with 495 nm and 575 nm wavelengths can be produced.

In some embodiments, as illustrated in FIG. 9A, a quantum entanglement source (QES), single photon counting modules (SPCMs), and a high-resolution time-to-digital converter can be used to quantify the entangled photon pair count rates. In this example, two SPCMs are coupled to a coincidence counter (CC), and a dichroic mirror (DM) provides wavelength selectivity for the lower and upper paths. With this configuration, approximately 107 photons/s can be produced, and coincidence photons, accidentals, the coincidence-to-accidental ratio (CAR), dark noise, and single counts can be measured, which enable the detection efficiency of the microscope to be determined.

In some embodiments, as illustrated in FIG. 9B, a two-stage parallel channel source can be implemented. As shown therein, a laser is split by a 50:50 BS into two beams each guided to different SPDC crystals whose outputs are fed into dedicated DM that splits the wavelength nondegenerate pairs into signal and idler arms. Using two coincidence counters (CC), the two-channel parallel output yield can be analyzed, taking into consideration insertion loss and other factors, to validate doubling of the yield.

The parallelization scheme, illustrated in FIG. 9B, leads to a doubling of entanglement production, as reported by detection and coincidence counting, even though the power of the pump for each channel constant is being kept constant. This illustrates that while taking losses into account, a two channel SPDC can be generated from a single pump.

As noted above, SPDC sources can be parallelized to develop a high power source of entangled photons. Parallelization prevents damage to SPDC crystals and preserves the quality of the entanglement. In an example, parallel SPDC sources can all be pumped by a single coherent light source via Variable Beam Splitters (VBS), creating SPDC channels. These SPDC channels can be combined—thus forming a single entanglement source of visible photons—and then, assuming non-degenerate SPDC, split by wavelength into signal and idler arms by means of a dichroic mirror. In another example, a variety of crystals with different non-degenerate idler and signal wavelengths can be considered, for driving different SPDC channels. After pair production, the channels can be spectrally combined into a single channel for pairs and then separate with a DM. For both examples, an example configuration can use 10 SPDC channels.

Figure 10:
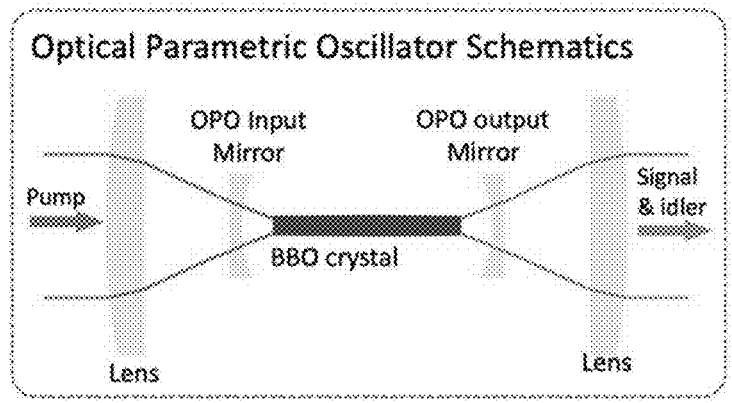
FIG. 10 is a schematic illustrating a parallel implementation of quantum entanglement based on a spectral multiplexing architecture.

The operation of the embodiments described herein can be optimized in a variety of different ways that include, but are not limited to:

testing SPDC rate production of candidate crystals, for example Periodically Poled Lithium Tantalate (PP-LT), PP-LBGO, and PPMgSLT (Oxide, Japan);

testing substitutes for PP crystals that possess second order nonlinear susceptibility, which include BBO (β-Barium Borate), CLBO (Cesium Lithium Borate), and LBO (Lithium Triborate). Each of these all suitable for 266 nm, and can handle high power pumping;

testing a Type-0 SPDC source with a PPKTP crystal pumped at 405 nm in order to achieve a high power SPDC source;

for BBO, using cavity-enhanced SPDC to improve rates, similar to an optical parametric oscillator (OPO) configuration, as illustrated in FIG. 10; and pumping SPDC using a 325 nm HeCd pump laser, which permits a larger range of crystals, including PPLN with Lithium Niobate.

Figure 11:
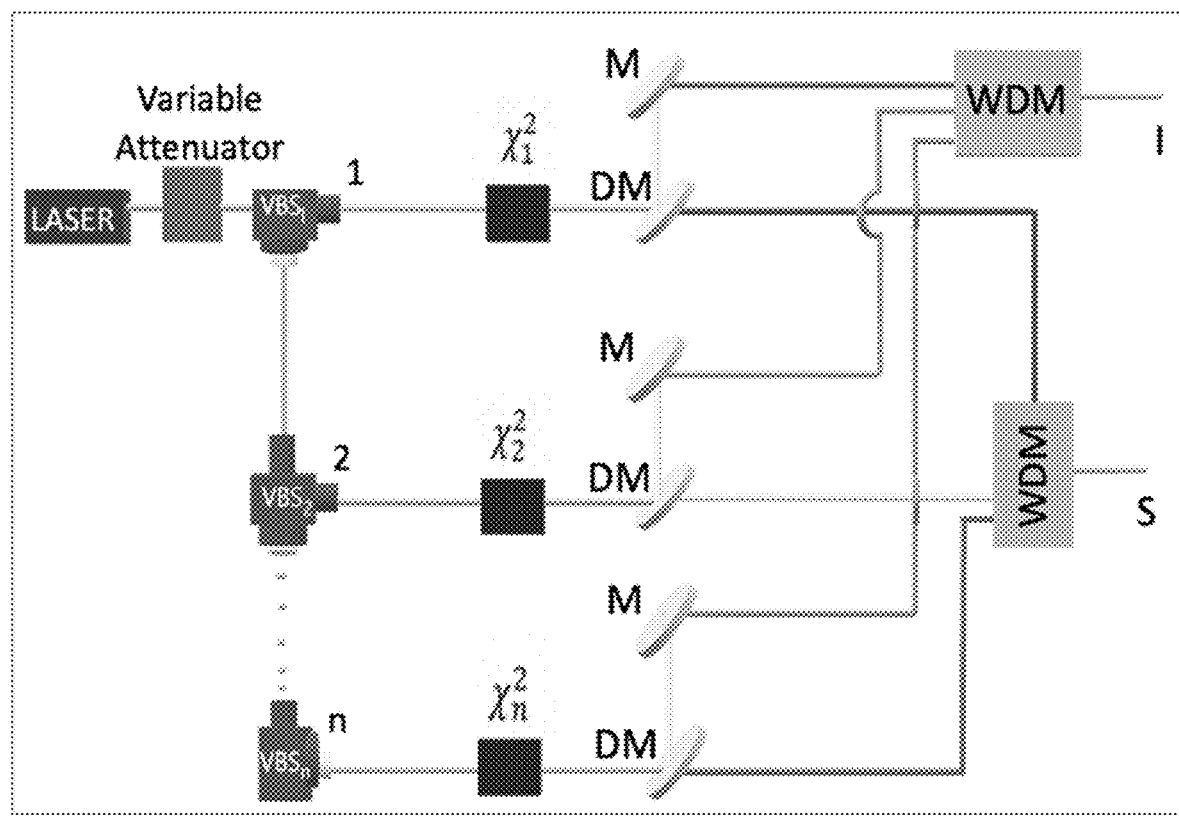
FIG. 11 is a schematic illustrating an example of an optical parametric oscillator.

In some embodiments, a fully parallel light source, combining 10 SPDC channels, and allowing high power pumping with 266 nm can be developed. In an example, for the packaging, integration of the laser with fiber power splitter or demultiplexer can be used for improving assembly on a PCB board that would provide an electrical layer for fine and independent temperature control of the nonlinear crystals. In another example, pick-and-place assembly technology can be used to position the various crystals with gratings, collimators, and mirrors for combining either power or spectral lines. In yet another example, a single CW laser can be split with 266 nm and 300 mW with variable power attenuators and variable beam splitters (VBS) to distribute the beam to 10 different SPDC channels ($\chi_1$-$\chi_{10}$) as shown in FIG. 11.

In some embodiments, the crystals can be cut at different angles to create different nondegeneracy in wavelength of pairs produced by each arm such that the colors of all pairs are slightly different from one another. A dichroic mirror can be used to split the nondegenerate pairs to Signal and Idler arms. The differences in wavelength allows the use of two wavelength division multiplexers (WDMs) to color combine the signal and idler into S and I channels, which provides at least an order of magnitude increase in yield.

In some embodiments, this circuit may be placed on a scalable CMOS package platform, which will introduce further parallelization, and result in an integrated package that can be used to build a source with 109 photons/s in visible wavelengths.

In existing systems, crystal damage may occur if too much input pump power is used to drive the crystal. Since SPDC is optimal with low pump power—as opposed to Single Harmonic Generation—the embodiments described herein do not drive the crystals too hard. However, in some embodiments, if the crystals are driven harder in power and longer to explore the balance between producing more pairs and reducing entanglement quality, special coatings on the crystal may be used for damage protection. In an example, for 266 nm pump, the growth of several crystals can be contracted using a Czochralski growth method optimized for a low loss and high damage threshold.

In some embodiments, to circumvent significant losses that may occur when combining beams post SPDC for the channels, a parallelized source can be used where the channels are not spectrally combined but rather delivered to the microscope as different imaging channels for the microscope. As before, each channel will be pumped by a CW laser split arm from a VBS. However, this time the output of the crystals is taken to individual DM to separate the signal from the idler. Different channels will produce different signal and idlers at the rate of up to $10^7$ photons/s or more. This embodiment offsets combining beams effectively into a single channel but may limit scalability because multiple detectors would be needed.

In some embodiments, higher brightness sources can be used by increasing the output capacity of the SPDC by introducing single channel arrays of crystals, and cavitation of the SPDC crystal. Instead of not using the pump post passing through the crystal, the beam can be continually utilized by passing it through other crystals sequentially in a row. Each SPDC crystal can also be placed in a cavity to allow for multiple collection opportunities as the beam works its way through the channel. Employing these design schemes can bring the HYEPS to $10^9$ photon/s brightness level.

Example two 2D photon timing detectors for detecting coincidence. In some embodiments, a dual breadboard that includes two 32×32 SPAD image sensors capable of detecting photon and time stamping them up to 106 million times per second per frame (on average, 104,000 per second per pixel) by using a bus of 32 channels operating at 160 Mbps. The timestamps, with a timing resolution of 50 ps (LSB), can be stored in local memory until needed and the two chips may be synchronized with a common clock, which also serves as a time reference to compute coincidences. Coincidences are computed by hardware computational units that are continuously running, and tasked with eliminating all those time stamps in one chip that cannot be coupled with a counterpart in the other chip. Coincidences can be coupled with a pair of pixels from both chips. In this example, an FPGA performs storage, sorting, and coordination tasks, as well as control of the two chips. The coincidences are transferred to a PC/Mac via a USB3 serial port, ensuring over 5 Gbps. This bit rate is ⅕ of the maximum data rate of a single chip; however, the number of coincidences are on average at most ¹/₁₀ of the time stamped photons, e.g., about 42.6 million per second, which can be easily handled by the USB3 port.

In some embodiments, a larger pair of sensors capable of performing a larger number of coincidences can be implemented. The sensors have at least 30,000 pixels and at least 10× as many timestamp generators, implemented as time-to-digital converters (TDCs) with a timing resolution of 40 ps (LSB). These coincidences are organized in the same way and stored locally but a compression mechanism and a larger memory can be implemented, along with a faster transfer mechanism based on PCI Express v.6.x, which is capable of up to 960 Gbps. This implementation can be configured to generate and transfer about 5 billion coincidences per second or about 125× what could be achieved in an example implementation. The chips can be mounted on a larger breadboard and may require a more powerful FPGA.

Example Applications for 3DQ Microscopy in Bioenergy Research

In some embodiments, the 3DQ microscope can be optimized for bioenergy research on microbe-host interactions. In an example application, the 3DQ microscope is used to image the dynamics of microalgal-bacterial interactions in real-time by documenting interactions between the diatom *Phaeodactylum tricornutum* and the beneficial bacterial strain *Marinobacter* sp. strain 3-2. In another example application, the 3DQ microscope can be used for a transparent soil experiment examining the dynamics of plant-fungal-bacteria interactions in the hyphosphere—the volume of interaction between symbiotic fungi and bacteria.

Application of short lifetime $O_2$ nanosensors. Nanosensors are polymeric nanoparticles that can be used to monitor in situ changes in analyte concentrations for both in vitro and in vivo applications. The nanosensor generates a fluorescent signal that correlates to the amount of analyte in the surrounding environment. As analyte concentrations change, nanosensor fluorescence intensity changes, while the reference dye does not. This provides a ratiometric measurement that is insensitive to nanosensor concentration; this corrects for inhomogeneities in sensor distribution in complex systems. This reaction is reversible, and the sensor particle is always in equilibrium with its surroundings, which allows for increases and decreases in analyte concentration for metabolic monitoring.

In some embodiments, $O_2$ nanosensor function can be determined in bacterial biofilms, whose intricate microenvironment contains 3D chemical gradients associated with physiological heterogeneity. In an example, the nanosensors are added to media during biofilm growth to distribute them throughout the biofilm. Each nanosensor is ~150 nm—large enough to be retained in a complex matrix such as a biofilm, but small enough to have no discernable impact on biofilm growth or morphology and to stay in solution. In another example, the $O_2$ nanosensors are used to monitor metabolism after antibiotic addition.

$O_2$ nanosensors can be configured with nanosecond fluorescence lifetime. In an example, the dynamic range and response parameters of the nanosensors can be tuned through formulation-based control approaches. As opposed to tailoring the response of conventional small molecule indicator dyes, which require extensive synthetic trial-and-error, the "recipe" of the nanosensors used herein to alter response can be changed.

Figure 12:
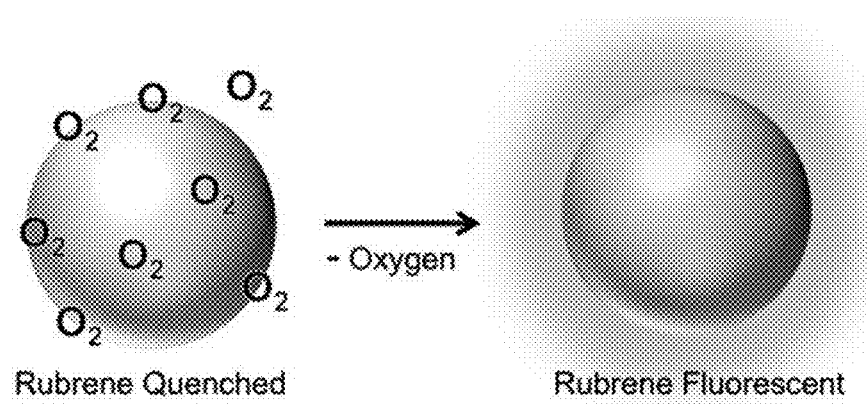
FIG. 12 illustrates an example of rubrene sensitivity to molecular oxygen.

In some embodiments, shorter lifetime singlet fluorescence-based rubrene systems can be adapted for the $O_2$ nanosensors, as illustrated in FIG. 12. Rubrene is excited by light from 450-530 nm, consistent with the parameters of the 3DQ microscope, and emits from 550-600 nm. Furthermore, it is soluble in polymeric matrices similar to the nanosensors being used and has a high quantum yield (0.98). In an example, the reference dye can also be changed to DiI (530-590 nm excitation; Invitrogen). The difference in fluorescence lifetime between these fluorophores (10 vs 1 ns) should enable the differentiation of these dyes in the 3DQ microscope and the performance of ratiometric measurements. The re-engineered $O_2$ nanosensors can be tested at CSM on axenic and co-cultured *P. tricornutum*, and amended with 500 nM 3-(3',4'-dichlorophenyl)-1,1-dimethylurea (DCMU) to partially arrest photosynthesis, and thus oxygenesis. A successful nanosensor will provide low fluorescence intensity surrounding the axenic algal cells and high intensities surrounding DCMU-treated cells.

In other embodiments, unplasticized polystyrene or neutral surfactants can be used. In yet other embodiments, dyes that are more structurally similar to the current CSM dyes (e.g. $Os^{II}(Ph_2phen)_2(Nbpy)$) can be used). In yet other embodiments, oxygen-quenched polyaromatic hydrocarbon dyes with shorter lifetimes then rubrene, and which are blue-shifted from rubrene, can be used. These have shorter lifetimes, but lower sensitivities to oxygen. These include a wide family of anthracene derivatives, which show suitable solubility in matrices similar to those used here while retaining good response to oxygen (~25% change between anoxic and atmospheric conditions).

Algal-bacterial interactions. Microalgae are ubiquitous and fast-growing photosynthesizing organisms—characteristics that make them central to global carbon cycling and attractive sources of feedstocks for sustainable production of biofuels and biomaterial. With their survival dependent on the availability of inorganic nutrients, vitamins, and growth-promoting metabolites, microalgae rely on interactions with bacterial communities that provide these services in exchange for freshly produced and exuded organic material. In production settings, these relationships are not well characterized, leading to uncertainty in the resilience of algal crops to predators and pathogens. Perhaps most importantly, there is limited knowledge on how to leverage these interactions to substantially enhance microalgal productivity, thereby reducing production costs to introduce more widespread, affordable, and sustainable energy and products.

Existing systems are unable to provide critical 3D details of this process-knowledge that is required to inform ongoing efforts to engineer microalgal microbiomes since attachment is hypothesized to be the central process by which both beneficial and harmful microbes interact with microalgae. For example, the attachment phenotype of beneficial bacteria can be potentially used to enhance microalgal growth and simultaneously eliminate niche space of pathogenic bacteria.

Embodiments of the disclosed technology can be configured to image interactions and record chemical changes at an unprecedented rate and illuminate key details on the mechanisms, dynamics, and outcome of the physical associations between individual bacterial and microalgal cells. Quantifying these features is crucial; for bacteria, growth increases would be advantageous for minimizing pathogen incursions through occupation of niche space and domination of nutrient uptake; for microalgae, growth increases would concentrate macromolecular precursors used for biofuel/bioproduct synthesis and make the cells more dense and thereby more prone to sinking, thereby increasing efficiency in biomass collection and extraction.

Figure 13:
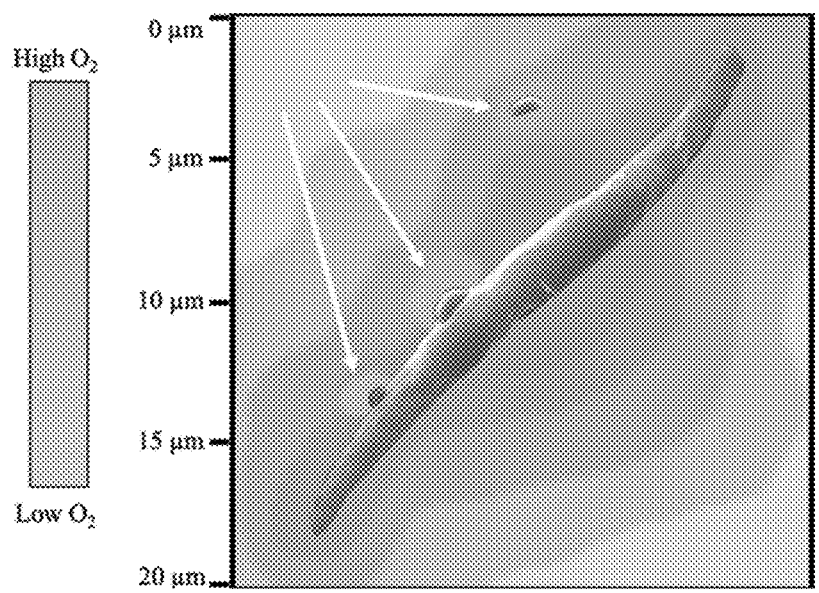
FIG. 13 illustrates a false color micrograph of an example microalga.

In an example, the model microalgae *P. tricornutum* and its microbiome, which is an important component that mediates metabolite exchanges that define these beneficial interactions, is considered by isolating *Marinobacter* sp. 3-2, a bacterial strain that promotes *P. tricornutum* growth. By co-culturing these organisms and using the in vivo volumetric imaging capability of the 3DQ microscope, the spatiotemporal dynamics of these interactions and the ensuing changes to algal and bacterial growth can be determined. FIG. 13 illustrates a false color micrograph of this example microalga. As shown therein, bacteria (indicated by arrows) are expected to cause local $O_2$ reduction.

AMF-bacterial interactions. Mycorrhizal fungi are critically important for plant nutrient uptake, and recent work has shown that mycorrhizal fungi type is one of the key determinants for soil C storage in terrestrial ecosystems. Mycorrhizal fungi are ancient plant root symbionts that act as extensions of the root zone, where the colonization by arbuscular mycorrhizal fungi (AMF) are thought to have allowed plants to colonize land 400 million years ago. However, while the plant-AMF symbiosis has been well studied, interactions between fungi and the surrounding soil microbial community are less well known. Some embodiments can be used to study AMF-bacterial interactions in the hyphosphere (the area surrounding the AMF hyphae) and determine how hyphal structure type attracts soil microbes and alters the microbial community's interactions with decomposing organic matter.

AMF are obligate biotrophs that obtain their C from the plant host and do not have the enzymatic capacity to decompose organic matter. However, AMF have been shown to enlist the microbial community to decompose organic matter and make N and P available for hyphal uptake and transport to the plant host. Little is known about AMF-bacterial interactions during decomposition or how AMF stimulate bacteria in soil.

Existing methods are unable to image live bacteria directly in soil. Non-destructive imaging methods (e.g., x-ray tomography, MRI) that allow resampling over time do not have the resolution to image individual bacteria in soil and cannot detect fluorophores. Destructive methods (e.g., NanoSIMS) are capable of imaging single-cells directly in soil, but cannot be resampled over time, and are typically dehydrated, embedded in resin, and sectioned prior to imaging. AMF have been imaged intact within soil using XRF on thin sections and using synchrotron imaging, but these methods have not included their bacterial partners. Due to difficulty of imaging bacteria in soil, some of the basic physical mechanisms of AMF-bacterial interactions (e.g., swarming, attachment, colony growth, dispersal) have not been imaged in a realistic soil matrix.

Transparent soils (TS) are optically clear and permit real-time single-cell imaging in a realistic soil matrix. TS can be milled to match soil texture, has similar cation exchange capacities as soil minerals, and are inert and cannot be consumed by microorganisms. TS have a similar refractive index as water and become optically clear when hydrated, allowing one to image fluorescently-labeled bacteria within soil-like pores to a depth of at least 100 μm within the matrix.

Embodiments of the disclosed technology are used image real-time AMF-bacterial interactions in a transparent soil hyphosphere. In an example, using a plant-mycorrhizal culture device (e.g., the MycoChip illustrated in FIG. 14), the root-AMF-bacterial interactions in transparent soil can be imaged. Hyphal-bacterial interactions will be imaged directly in the MycoChip, which has a root compartment and a hyphal compartment that excludes roots. Transparent soil (e.g., TS, nafion particles) will be used to allow fluorescent imaging of AMF, bacteria, $O_2$ nanosensors, and the transparent soil edges. Herein, a well-established plant-AMF symbiosis (the model grass for bioenergy studies *Brachypodium dystachion* inoculated with *Rhizophagus intraradices*) can be used.

Figure 14:
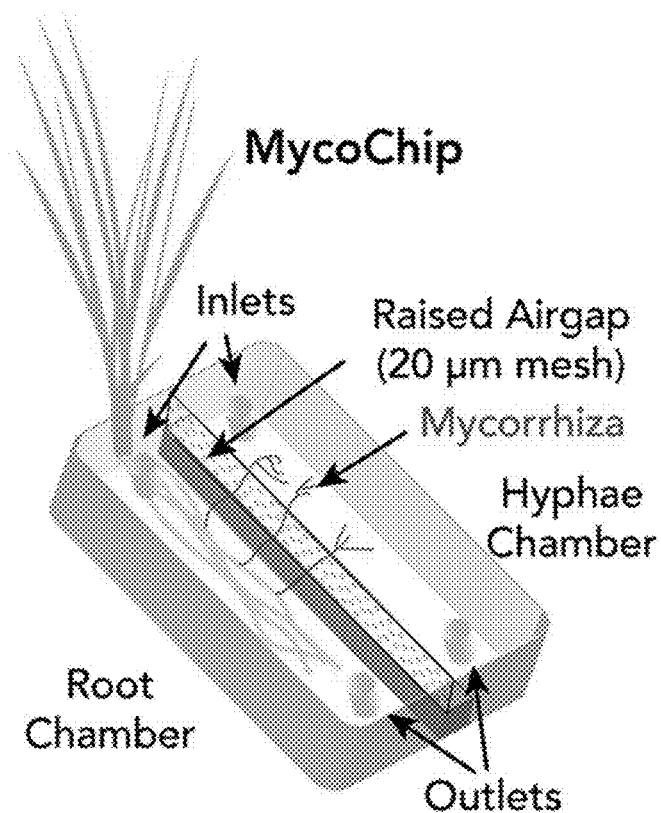
FIG. 14 is a schematic illustrating an example controlled microfluidic system.

In some embodiments, a 3DQ-compatible MycoChip adds a glass side to the MycoChip, shown in FIG. 14, for 3DQ volumetric imaging. In an example, the optimal growth conditions for AMF in TS can be assessed; e.g., determining the best media for pore water (e.g., filtered soil extract, or M media for AMF), watering requirements, and TS matrix (nafion, cryolite, hydrogel beads). In another example, the following methodology can be adopted:

(1) image GFP-labeled bacteria in transparent soil within fluorometer cuvettes;
(2) image GFP-bacteria, naturally autofluorescent AMF hyphae and the soil matrix without the need for additional stains. Nafion particle edges are visible in brightfield or DIC, but can be stained with sulphorhodamine (excitation 561 nm, emission 595 nm) to improve contrast. In some cases, dead AMF hyphae are added for simplicity and to ensure rapid tests; and
(3) grow AMF in the MycoChips and inoculate the AMF with GFP-bacteria, and image AMF-bacterial interactions.

In some embodiments, based on the knowledge that plant roots release C as exudates (e.g., sugars, starches, polysaccharides) into soil depending on location along the root, and the largest amount of exudates are released at the root tip and root hairs, it can be determined whether AMF releases different quantities of exudates at different hyphal structures and whether it exudes the most exudates in the presence of decaying root litter. This may be achieved by using a bacterial GFP-bioreporter to detect fructose levels in the TS matrix. Fructose is a sugar exuded by AMF that has previously been shown to perform as a signaling molecule for P solubilizing bacteria.

Figure 15:
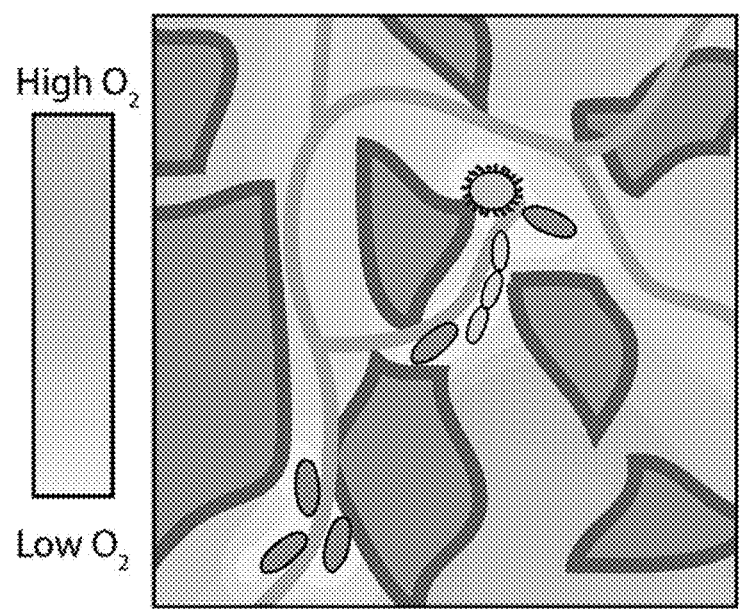
FIG. 15 illustrates a false color micrograph of bacteria in soil.

In some embodiments, as shown in FIG. 15, $O_2$ nanosensors can be deployed to create a non-invasive, real-time 3D readout of the $O_2$ concentrations in pore spaces and aggregates surrounding hyphae and bacteria. Increased heterotrophic respiration due to large numbers of bacteria has been shown to cause zones of depleted oxygen in the rhizosphere, and it is expected that the zones with greatest bacterial swarming and fructose exudation will be associated with lower oxygen levels.

In some embodiments, a bioreporter for fructose can be genetically engineered. In an example, *Rhizobia* has been engineered with a lux bioreporter to detect extracellular fructose. In another example, this can be replaced with GFP because lux emanates light and therefore is not compatible with the 3DQ, which requires a fluorescent response.

Figure 16:
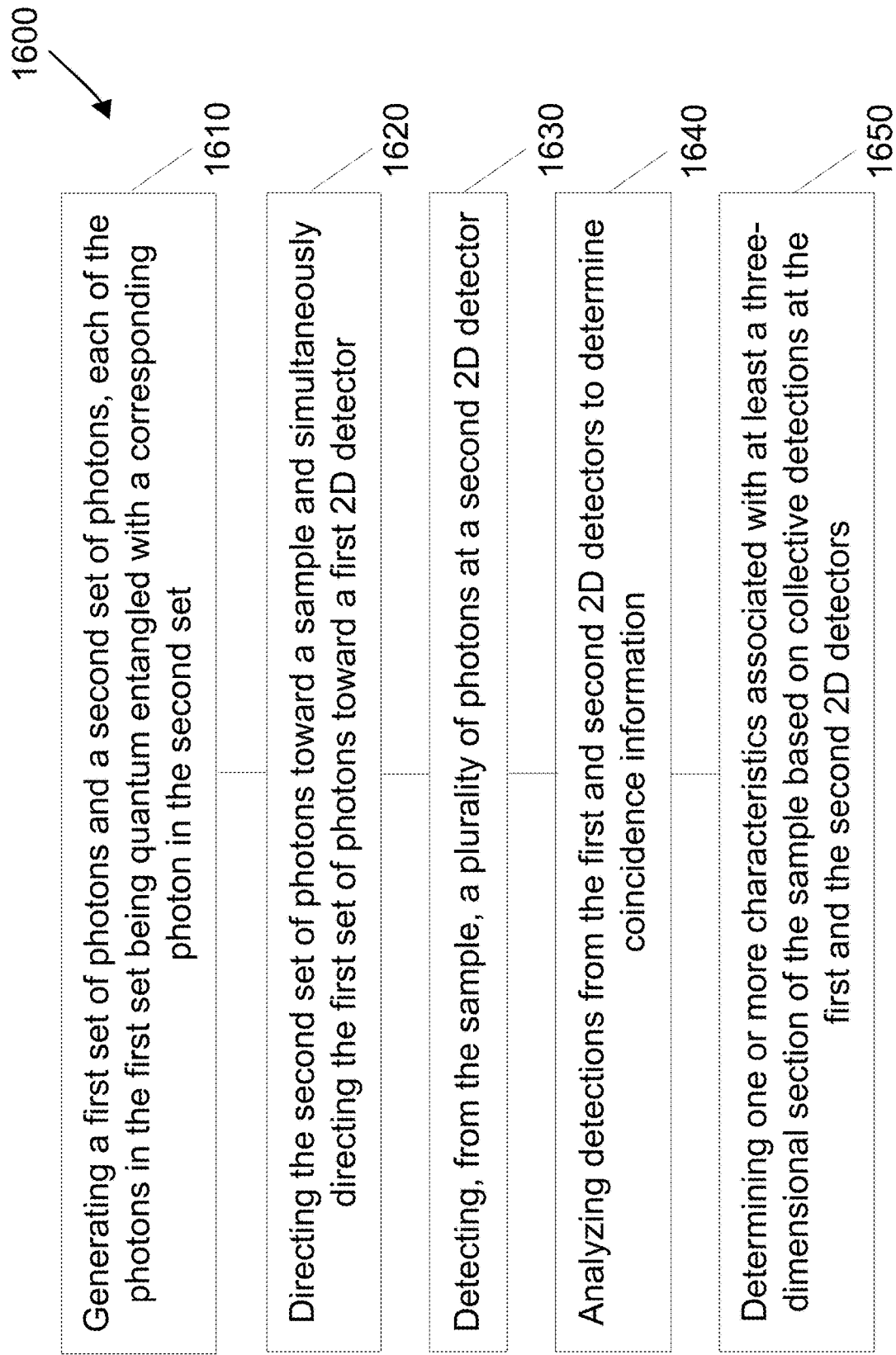
FIG. 16 illustrates a flowchart of a method for widefield 3D fluorescence microscopy with a quantum entanglement light source.

FIG. 16 illustrates a flowchart of a method 1600 for widefield 3D fluorescence microscopy with a quantum entanglement light source. The method 1600 includes, at operation 1610, generating a first set of photons and a second set of photons, each of the photons in the first set being quantum entangled with a corresponding photon in the second set.

The method 1600 includes, at operation 1620, directing the second set of photons toward a sample and simultaneously directing the first set of photons toward a first two-dimensional (2D) detector. In an example, the first and second set of photons are directed toward the sample and the first 2D detector, respectively, one photon at a time. In another example, multiple photons that are part of the same imaging event can be directed toward the sample and the first 2D detector. That is, multiple photons can be incident on the sample and the first 2D detector at different spatial locations, and each pair of photons in the multiple photons that are quantum entangled are identified.

The method 1600 includes, at operation 1630, detecting, from the sample, a plurality of photons at a second 2D detector, wherein the plurality of photons is produced in response to absorption and reemission, scattering, or reflection of the second set of photons by or from the sample.

The method 1600 includes, at operation 1640, analyzing detections from the first and second 2D detectors to determine coincidence information.

The method 1600 includes, at operation 1650, determining one or more characteristics associated with at least a three-dimensional (3D) section of the sample based on collective detections at the first and the second 2D detectors, wherein the detections at the first 2D detector correspond to two spatial dimensions of the 3D section of the sample and the detections at the second 2D detector correspond to at least a third dimension of the 3D section of the sample.

In some embodiments, the sample is a biological sample.

In some embodiments, the one or more characteristics include at least one of a 3D volumetric image of the sample, a fluorescence absorption or emission spectra of the sample, a fluorescence emission lifetime associated with the sample, or a scattering process associated with the sample.

In some embodiments, each photon detection at the second 2D detector is associated with a corresponding photon detection at the first 2D detector based on a coincident detection of the quantum entangled photons.

In some embodiments, the method 1600 further includes the operation of using a coincidence counter that records a position of a photon on the first 2D detector only if a detection on the second 2D detector is detected either substantially simultaneously or after an interval of time associated with fluoresce emission of the sample.

In some embodiments, the plurality of photons detected by the second 2D detector are emitted due to a fluorescence process or a scattering process associated with the sample.

In some embodiments, the detections at one of the 2D detectors correspond to X and Y dimensions of the 3D volumetric image, and the detections at the other of the 2D detectors correspond to at least a Z dimension.

In some embodiments, the detections at the other of the 2D detectors correspond to one of X and Z dimensions, or Y and Z dimensions.

In some embodiments, generating the 3D volumetric image comprises (a) using the second 2D detector to determine an arrival time and a first spatial coordinate associated with a first photon of an entangled photon pair, (b) using the first 2D detector to determine a second and a third spatial coordinate associated with a second photon of the entangled photon pair, and (c) repeating operations (a) and (b) for additional photon pairs. As discussed above, in some embodiments, the additional photon pairs may arrive almost simultaneously at the first and second photons, as part of the same imaging event, and will be detected at different spatial coordinates.

Embodiments of the disclosed technology include a system for widefield 3D fluorescence microscopy with a quantum entanglement light source. In an example, the system includes an idler arm comprising one or more optical components to receive and direct a first set of photons to a first two-dimensional (2D) detector, a signal arm comprising one or more optical components to receive and direct a second set of photons to a sample, and a second 2D detector positioned to receive and detect emitted or scattered photons from the sample in response to receiving the second set of photons, wherein each photon in the first set of photons is quantum entangled with a corresponding photon in the second set of photons, wherein information obtained from detections from the first 2D detector and the second 2D detector provide coincidence detection information to identify at least a subset of the first set of photons detected by the first 2D detector that have corresponding detections at the second 2D detector, and wherein the detections at the first 2D detector and the second 2D detector collectively enable a determination of a three-dimensional (3D) volumetric image of the sample.

In some embodiments, the system further includes a processor and a memory including instructions stored thereon, wherein the instructions upon execution of the processor cause the processor to generate a first 2D image and a second 2D image based on the subset of the first set of photons detected by the first detector and the corresponding detections at the second 2D detector, respectively, and combine the first 2D image and the second 2D image to generate the 3D volumetric image representative of the sample.

In some embodiments, the coincidence detector records positions of the subset of the first photons detected by the first 2D detector based on a timing relationship with the corresponding detections at the second 2D detector.

In some embodiments, the system further includes a quantum light source configured to generate the first and the second set of entangled photons, wherein the light source is configured to produce the first and the second set of photons that are characterized by one or more of the following: differ in wavelength, have the same wavelength, differ in polarization, or have the same polarization.

In some embodiments, the sample comprises a biological sample comprising a fluorescence process or a scattering process.

In some embodiments, the first 2D detector and the second 2D detector is a 2D single photon avalanche diode (SPAD) detector.

In some embodiments, one of the first 2D detector or the second 2D detector is configured to produce detections corresponding to a first and a second spatial dimensions, and the other of the first 2D detector or the second 2D detector is configured to produce detections corresponding to at least a third spatial dimension.

In some embodiments, the first 2D detector is configured to produce detections associated with the at least the third spatial dimension and the second 2D detector is configured to produce detections associated with the first and the second spatial dimensions.

In some embodiments, one of the first 2D detector or the second 2D detector is configured to produce detections corresponding to X and Y dimensions, and the other of the first 2D detector or the second 2D detector is configured to produce detections corresponding to at least a Z dimension.

In some embodiments, the other of the first 2D detector or the second 2D detector is configured to produce detections corresponding to one of X and Z dimensions or Y and Z dimensions.

In some embodiments, each of the first 2D detector and the second 2D detector records an arrival time and a spatial position of each photon detected thereon.

In some embodiments, the 3DQ imaging device is a microscope.

Figure 17:
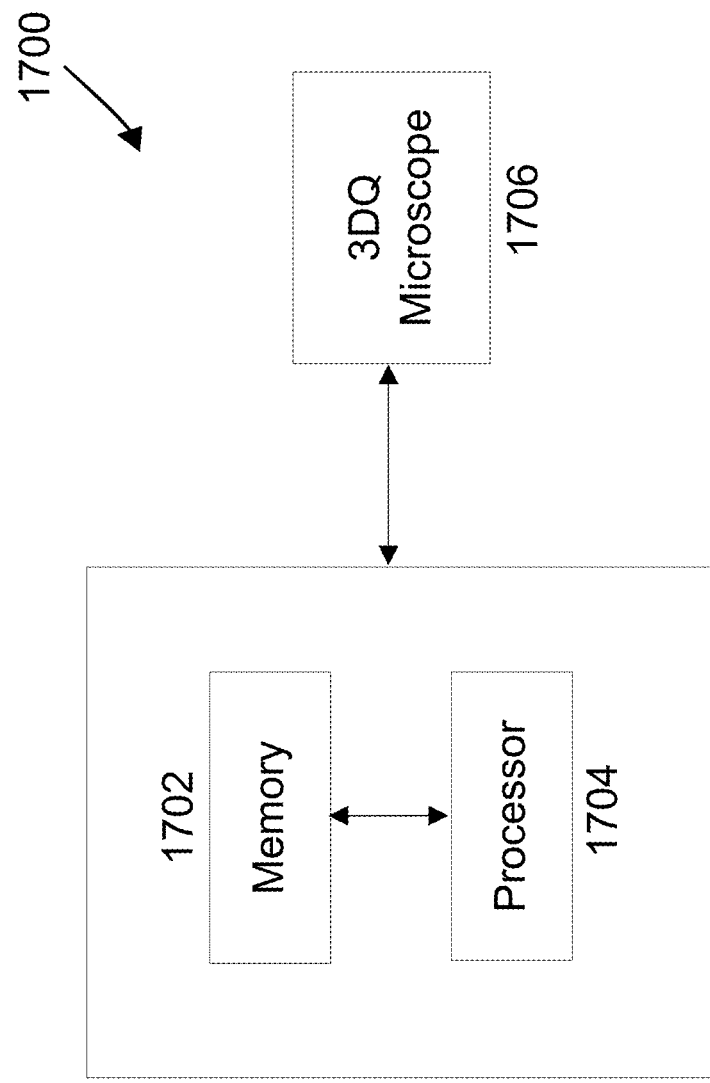
FIG. 17 illustrates an example of an apparatus that can implement methods and techniques for widefield 3D fluorescence microscopy with a quantum entanglement light source.

FIG. 17 is a block diagram of an example hardware apparatus (which includes the illustrated electrical and processing hardware and optical hardware that is not shown in FIG. 17) that can accommodate at least some of the disclosed technology. The apparatus 1800 may include one or more processors 1702, one or more memories 1704 and a 3DQ-microscope 1706. The processor(s) 1702 may be configured to implement one or more methods (including, but not limited to, method 1600) described in the present document. The memory (memories) 1704 may be used for storing data and code used for implementing the methods and techniques described herein. The 3DQ-microscope 1706 is coupled to the processor 1702 and/or the memory 1704 and can receive commands and signals from the processor; the 3DQ-microscope 1706 may also transmit signals including data and commands to the processor 1702 and/or memory 1704.

Implementations of the subject matter and the functional operations described in this patent document can be implemented in various systems, optical components, digital electronic circuitry, or in computer software, firmware, or hardware, including the structures disclosed in this specification and their structural equivalents, or in combinations of one or more of them.

Part of the disclosed subject matter in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A three-dimensional quantum (3DQ) imaging device, comprising:
    an idler arm comprising one or more optical components to receive and direct a first set of photons to a first two-dimensional (2D) detector, the first set of photons being directed to the first 2D detector without being incident on a sample;
    a signal arm comprising one or more optical components to receive and direct a second set of photons to the sample; and
    a second 2D detector positioned to receive and detect emitted or scattered photons from the sample in response to receiving the second set of photons,
    wherein each photon in the first set of photons is quantum entangled with a corresponding photon in the second set of photons,
    wherein information obtained from detections from the first 2D detector and the second 2D detector provide coincidence detection information to identify at least a subset of the first set of photons detected by the first 2D detector that have corresponding detections at the second 2D detector, and
    wherein the detections at the first 2D detector and the second 2D detector collectively enable a determination of a three-dimensional (3D) volumetric image of the sample.

2. The 3DQ imaging device of claim 1, further comprising:
    a processor and a memory including instructions stored thereon, wherein the instructions upon execution of the processor cause the processor to:
        generate a first 2D image and a second 2D image based on the subset of the first set of photons detected by the first detector and the corresponding detections at the second 2D detector, respectively; and
        combine the first 2D image and the second 2D image to generate the 3D volumetric image representative of the sample.

3. The 3DQ imaging device of claim 1, wherein the coincidence detector records positions of the subset of the first photons detected by the first 2D detector based on a timing relationship with the corresponding detections at the second 2D detector.

4. The 3DQ imaging device of claim 1, further comprising:
    a quantum light source configured to generate the first and the second set of entangled photons, wherein the light source is configured to produce the first and the second set of photons that are characterized by one or more of the following:
    differ in wavelength,
    have the same wavelength,
    differ in polarization, or
    have the same polarization.

5. The 3DQ imaging device of claim 1, wherein the sample comprises a biological sample comprising a fluorescence process or a scattering process.

6. The 3DQ imaging device of claim 5, wherein the first 2D detector and the second 2D detector is a 2D single photon avalanche diode (SPAD) detector.

7. The 3DQ imaging device of claim 1, wherein:
    one of the first 2D detector or the second 2D detector is configured to produce detections corresponding to a first and a second spatial dimensions, and
    the other of the first 2D detector or the second 2D detector is configured to produce detections corresponding to at least a third spatial dimension.

8. The 3DQ imaging device of claim 7, wherein the first 2D detector is configured to produce detections associated with the at least the third spatial dimension and the second 2D detector is configured to produce detections associated with the first and the second spatial dimensions.

9. The 3DQ imaging device of claim 7, wherein:
    one of the first 2D detector or the second 2D detector is configured to produce detections corresponding to X and Y dimensions, and
    the other of the first 2D detector or the second 2D detector is configured to produce detections corresponding to at least a Z dimension.

10. The 3DQ imaging device of claim 9, wherein:
the other of the first 2D detector or the second 2D detector is configured to produce detections corresponding to one of: X and Z dimensions or Y and Z dimensions.

11. The 3DQ imaging device of claim 1, wherein each of the first 2D detector and the second 2D detector records an arrival time and a spatial position of each photon detected thereon.

12. The 3DQ imaging device of claim 1, wherein the 3DQ imaging device is a microscope.

13. A method for three-dimensional quantum (3DQ) imaging, comprising:
generating a first set of photons and a second set of photons, wherein each of the photons in the first set is quantum entangled with a corresponding photon in the second set;
directing the second set of photons toward a sample and simultaneously directing the first set of photons toward a first two-dimensional (2D) detector without the first set of photons being incident on the sample;
detecting, from the sample, a plurality of photons at a second 2D detector, wherein the plurality of photons is produced in response to absorption and reemission, scattering, or reflection of the second set of photons by or from the sample;
analyzing detections from the first and second 2D detectors to determine coincidence information; and
determining one or more characteristics associated with at least a three-dimensional (3D) section of the sample based on collective detections at the first and the second 2D detectors, wherein the detections at the first 2D detector correspond to two spatial dimensions of the 3D section of the sample and the detections at the second 2D detector correspond to at least a third dimension of the 3D section of the sample.

14. The method of claim 13, wherein each photon detection at the second 2D detector is associated with a corresponding photon detection at the first 2D detector based on a coincident detection of the quantum entangled photons.

15. The method of claim 13, further comprising:
using a coincidence counter that records a position of a photon on the first 2D detector only if a detection on the second 2D detector is detected either substantially simultaneously or after an interval of time associated with fluoresce emission of the sample.

16. The method of claim 13, wherein the plurality of photons detected by the second 2D detector are emitted due to a fluorescence process or a scattering process associated with the sample.

17. The method of claim 13, wherein:
the detections at one of the 2D detectors correspond to X and Y dimensions of the 3D volumetric image, and
the detections at the other of the 2D detectors correspond to at least a Z dimension.

18. The method of claim 17, wherein the detections at the other of the 2D detectors correspond to one of: X and Z dimensions, or Y and Z dimensions.

19. The method of claim 13, wherein generating the 3D volumetric image comprises:
(a) using the second 2D detector to determine an arrival time and a first spatial coordinate associated with a first photon of an entangled photon pair,
(b) using the first 2D detector to determine a second and a third spatial coordinate associated with a second photon of the entangled photon pair, and
(c) repeating operations (a) and (b) for additional photon pairs.

20. The method of claim 13, wherein the one or more characteristics include at least one of:
a 3D volumetric image of the sample,
a fluorescence absorption or emission spectra of the sample,
a fluorescence emission lifetime associated with the sample, or
a scattering process associated with the sample.

* * * * *